US011216496B2

United States Patent
Duffy

(10) Patent No.: US 11,216,496 B2
(45) Date of Patent: Jan. 4, 2022

(54) VISUAL INTERACTIVE SEARCH

(71) Applicant: Evolv Technology Solutions, Inc., San Francisco, CA (US)

(72) Inventor: Nigel Duffy, San Francisco, CA (US)

(73) Assignee: Evolv Technology Solutions, Inc., San Francisco, CA (US)

( * ) Notice: Subject to any disclaimer, the term of this patent is extended or adjusted under 35 U.S.C. 154(b) by 0 days.

(21) Appl. No.: 16/681,514

(22) Filed: Nov. 12, 2019

(65) Prior Publication Data

US 2020/0081906 A1    Mar. 12, 2020

Related U.S. Application Data

(63) Continuation of application No. 15/311,163, filed as application No. PCT/IB2015/001267 on May 4, (Continued)

(51) Int. Cl.
  *G06F 16/33*     (2019.01)
  *G06F 16/2455*   (2019.01)
  (Continued)

(52) U.S. Cl.
  CPC ...... *G06F 16/3328* (2019.01); *G06F 16/2455* (2019.01); *G06F 16/904* (2019.01); *G06F 16/93* (2019.01); *G06F 16/25* (2019.01)

(58) Field of Classification Search
  CPC .... G06F 16/3328; G06F 16/338; G06F 16/93; G06F 16/904; G06F 16/2455; G06F 16/25
  See application file for complete search history.

(56) References Cited

U.S. PATENT DOCUMENTS 5,696,964 A    12/1997  Cox et al.
5,930,784 A *   7/1999  Hendrickson ........... G06F 16/34
(Continued)

FOREIGN PATENT DOCUMENTS

CN    103530649 A    1/2014
WO    02/054287 A2   7/2002

OTHER PUBLICATIONS

"Distance", Wikipedia, http://en.wikipedia.org/wiki/Distance, last modified on Jun. 4, 2014, 7 pages.
(Continued)

*Primary Examiner* — Alford W Kindred
*Assistant Examiner* — Cecile H Vo
(74) *Attorney, Agent, or Firm* — Haynes Beffel & Wolfeld LLP; Andrew Dunlap

(57) ABSTRACT

Roughly described, a system for user identification of a desired document. A database is provided which identifies a catalog of documents in an embedding space, the database identifying a distance in the embedding space between each pair of documents corresponding to a predetermined measure of dissimilarity between the pair of documents. The system presents an initial collection of the documents toward the user, from an initial candidate space which is part of the embedding space. The system then iteratively refines the candidate space using geometric constraints on the embedding space determined in response to relative feedback by the user. At each iteration the system identifies to the user a subset of documents from the then-current candidate space, based on which the user provides the relative feedback. In an embodiment, these subsets of documents are more discriminative than the average discriminativeness of similar sets of documents in the then-current candidate space.

20 Claims, 19 Drawing Sheets

Related U.S. Application Data 2015, now Pat. No. 10,503,765, which is a continuation-in-part of application No. 14/494,364, filed on Sep. 23, 2014, now abandoned.

(60) Provisional application No. 61/994,048, filed on May 15, 2014.

(51) Int. Cl.
*G06F 16/332* (2019.01)
*G06F 16/93* (2019.01)
*G06F 16/904* (2019.01)
*G06F 16/25* (2019.01)

(56) References Cited

U.S. PATENT DOCUMENTS

| | | | |
|---|---|---|---|
| 6,098,034 | A | 8/2000 | Razin et al. |
| 6,286,018 | B1 | 9/2001 | Pitkow et al. |
| 6,347,313 | B1 | 2/2002 | Ma et al. |
| 6,353,825 | B1 | 3/2002 | Ponte |
| 6,574,616 | B1 | 6/2003 | Saghir |
| 7,099,860 | B1 | 8/2006 | Liu et al. |
| 7,152,031 | B1 | 12/2006 | Jensen et al. |
| 7,200,243 | B2 | 4/2007 | Keenan et al. |
| 7,480,640 | B1 | 1/2009 | Elad et al. |
| 7,567,960 | B2 | 7/2009 | Wei et al. |
| 7,813,581 | B1 | 10/2010 | Fitzpatrick et al. |
| 7,814,107 | B1 | 10/2010 | Thirumalai et al. |
| 8,027,541 | B2 | 9/2011 | Hua et al. |
| 8,150,822 | B2 | 4/2012 | Bluvband et al. |
| 8,160,939 | B2 | 4/2012 | Schrenk |
| 8,170,966 | B1 | 5/2012 | Musat et al. |
| 8,254,697 | B2 | 8/2012 | Isard et al. |
| 8,676,802 | B2 | 3/2014 | Zelevinsky et al. |
| 8,832,134 | B2 | 9/2014 | Gronow et al. |
| 8,843,478 | B1 | 9/2014 | Jing et al. |
| 8,972,394 | B1 | 3/2015 | Tong et al. |
| 9,116,976 | B1 | 8/2015 | Bem et al. |
| 10,102,277 | B2 * | 10/2018 | Legrand ............... G06Q 30/00 |
| 10,503,765 | B2 * | 12/2019 | Duffy ............... G06F 16/3328 |
| 2002/0091678 | A1 * | 7/2002 | Miller ............... G06F 16/338 |
| 2002/0138478 | A1 | 9/2002 | Schwartz et al. |
| 2002/0164078 | A1 * | 11/2002 | Uehara ............... G06K 9/6251 382/224 |
| 2004/0107194 | A1 * | 6/2004 | Thorpe ............... G06F 16/3328 |
| 2005/0165600 | A1 | 7/2005 | Kasravi et al. |
| 2006/0212415 | A1 | 9/2006 | Backer et al. |
| 2007/0011154 | A1 | 1/2007 | Musgrove et al. |
| 2007/0174244 | A1 | 7/2007 | Jones |
| 2007/0288432 | A1 | 12/2007 | Weltman et al. |
| 2008/0126464 | A1 | 5/2008 | Mowzoon |
| 2008/0140684 | A1 | 6/2008 | O'Reilly et al. |
| 2008/0243842 | A1 | 10/2008 | Liang et al. |
| 2008/0306943 | A1 | 12/2008 | Patterson |
| 2009/0132347 | A1 | 5/2009 | Anderson et al. |
| 2010/0104191 | A1 | 4/2010 | McGwire |
| 2010/0134415 | A1 * | 6/2010 | Iwase ............... G06F 3/04883 345/158 |
| 2010/0223258 | A1 | 9/2010 | Ghahramani et al. |
| 2010/0293117 | A1 | 11/2010 | Xu |
| 2011/0029561 | A1 | 2/2011 | Slaney et al. |
| 2011/0064316 | A1 | 3/2011 | Hamamura et al. |
| 2011/0246409 | A1 | 10/2011 | Mitra |
| 2013/0191381 | A1 | 7/2013 | Jin et al. |
| 2013/0212090 | A1 | 8/2013 | Sperling et al. |
| 2013/0226922 | A1 | 8/2013 | Labenski et al. |
| 2013/0246439 | A1 | 9/2013 | Liekens et al. |
| 2013/0336588 | A1 | 12/2013 | Rane et al. |
| 2014/0019431 | A1 | 1/2014 | Suleyman et al. |
| 2014/0019484 | A1 | 1/2014 | Coppin et al. |
| 2014/0222789 | A1 | 8/2014 | Gras |
| 2015/0036948 | A1 | 2/2015 | Wenzel et al. |
| 2015/0088871 | A1 | 3/2015 | Ruotsalo et al. |
| 2015/0286957 | A1 | 10/2015 | Knight |
| 2015/0331908 | A1 * | 11/2015 | Duffy ............... G06F 16/904 707/765 |
| 2016/0350336 | A1 | 12/2016 | Checka et al. |
| 2017/0091319 | A1 * | 3/2017 | Legrand ............... G06F 16/3346 |

OTHER PUBLICATIONS

Balasubramanian, Mukund, and Schwartz, Eric L., "The Isomap Algorithm and Topological Stability", Science, vol. 295, Jan. 4, 2002, p. 7a, 3 pages.

"Metric Tree", Wikipedia, http://en.wikipedia.org/wiki/Metric_tree, last modified on Jun. 12, 2014, 2 pages.

Ishiwaka et al., "MindReader: Querying Databases Through Multiple Examples," VLDB'98, Proceedings of 24th International Conference on Very Large Data Bases, Aug. 24-27, 1998, New York City, pp. 218-227.

Drucker et al., "Support Vector Machines: Relevance Feedback and Information Retrieval," Information Processing and Management 38 (2002), pp. 305-323 (accepted May 11, 2001).

Rui et al., "Relevance Feedback: A Power Tool for Interactive Content-Based Image Retrieval," Circuits and Systems for Video Technology, IEEE Transactions on, vol. 8, No. 5, Sep. 1998, pp. 1-13.

Tieu et al., "Boosting Image Retrieval," International Journal of Computer Vision 56(1/2), pp. 17-36, 2004 (Accepted Jul. 16, 2003).

Tong, et al., "Support Vector Machine Active Learning for Image Retrieval," In Proceedings of the ACM International Conference on Multimedia, 12 pages, ACM Press, 2001.

Kovashka, et al., "WhittleSearch: Image Search with Relative Attribute Feedback," Proceedings of the IEEE Conference on Computer Vision and Pattern Recognition (CVPR) (2012) 8 pages.

Zhou et al., "Relevance feedback in image retrieval: A comprehensive review," Multimedia systems 8.6 (2003), 25 pages.

Manning et al., Introduction to Information Retrieval, Chapter 9: Relevance Feedback and Query Expansion, Cambridge University Press, Apr. 1, 2009, pp. 177-194.

He, Jingrui, et al. "Manifold-ranking based image retrieval." Proceedings of the 12th annual ACM international conference on Multimedia. ACM, 2004, pp. 9-16.

Zhang et al., "iFind—A Sstem for Semantics and Feature Based Image Retrieval Over Internet," Proc. ACM Multimedia, ACM Press 2000, 2 pages.

Fang, et al., "Experiments in mental face retrieval." Audio- and Video-Based Biometric Person Authentication. Springer Berlin Heidelberg, 2005, 10 pages.

Vinay, et al. "Evaluating relevance feedback algorithms for searching on small displays." Advances in Information Retrieval. Springer Berlin Heidelberg, 2005. 185-199.

Vinay, et al. "Evaluating relevance feedback and display strategies for searching on small displays." String Processing and Information Retrieval. Springer Berlin Heidelberg, 2004, 2 pages.

Datta, et al. "Image retrieval: Ideas, Influences, and Trends of the New Age." ACM Computing Surveys (CSUR) 40.2 (2008): 5, 60 pages.

Tao et al., "Asymmetric Bagging and Random Subspace for Support Vector Machines-Based Relevance Feedback in Image Retrieval," IEEE Transactions on Pattern Analysis and Machine Intelligence, vol. 28, No. 7, Jul. 2006, pp. 1088-1099.

Cox, et al. "The Bayesian Image Retrieval System, PicHunter: Theory, Implementation, and Psychophysical Experiments." Image Processing, IEEE Transactions on 9.1 (2000): pp. 20-37.

Cox, et al. "An Optimized Interaction Strategy for Bayesian Relevance Feedback." Computer Vision and Pattern Recognition, 1998. Proceedings. 1998 IEEE Computer Society Conference on. IEEE, 1998, 6 pages.

Cox, et al. "Pichunter: Bayesian relevance feedback for image retrieval." Pattern Recognition, 1996., Proceedings of the 13th International Conference on. vol. 3. IEEE, 1996, 9 pages.

"Rocchio Algorithm," Wikipedia, http://en.wikipedia.org/wiki/Rocchio_algorithm, accessed Apr. 29, 2015, 3 pages.

"Online Machine Learning," Wikipedia, http://en.wikipedia.org/wiki/Online_machine_learning, accessed Apr. 29, 2015, 6 pages.

(56) References Cited

OTHER PUBLICATIONS

"Multi-Armed Bandit," Wikipedia, http://en.wikipedia.org/wiki/Multi-armed_bandit, accessed Apr. 29, 2015, 10 pages.
"K-Means Clustering," Wikipedia, http://en.wikipedia.org/wiki/K-means_clustering, accessed Apr. 29, 2015, 9 pages.
"K-Medoids," Wikipedia, http://en.wikipedia.org/wiki/K-means_clustering, accessed Apr. 29, 2015, 7 pages.
Brisaboa et al., "Spatial Selection of Sparse Pivots for Similarity Search in Metric Spaces," JCS&T vol. 7 No. 1, Apr. 2007, 6 pages.
Elad, et al., "Content Based Retrieval of VRML Objects—An Iterative and Interactive Approach," Springer Vienna, 2002, 12 pages.
Collins, et al., "New Ranking Algorithms for Parsing and Tagging: Kernels Over Discrete Structures, and the Voted Perceptron," ACL '02 Proceedings of the 40th Annual Meeting on Association for Computational Linguistics, 2002, 9 pages.
Freund, et al., "An Efficient Boosting Algorithm for Combining Preferences," Journal of Machine Learning Research 4 (2003) 37 pages.
PCT/IB2015/001267—International Search Report and Written Opinion dated Oct. 15, 2015, 9 pages.
Cesa-Bianchi et al., "Prediction, Learning, and Games," Cambridge University Press, 2006, 403 pages.
PCT/IB2015/001267—International Preliminary Report on Patentability dated Nov. 15, 2016, 7 pages.
Johnson, "Approximation Algorithms for Combinatorial Problems", MIT, 1974, pp. 38-49.
Allesiardo, et al., "A Neural Networks Committee for the Contextual Bandit Problem." Neural Information Processing. Springer International Publishing, 8 pages (2014).
Auer et al., "Finite-time analysis of the multiarmed bandit problem," Machine learning 47.2-3 (2002): 235-256.
Bouneffouf, et al., "A contextual-bandit algorithm for mobile context-aware recommender system." Neural Information Processing. Springer Berlin Heidelberg, 9 Pages (2012).
Burnetas et al., "Optimal adaptive policies for sequential allocation problems." Advances in Applied Mathematics 17.2 (1996): 122-142.
Burnetas and Katehakis, "Optimal adaptive policies for Markov decision processes." Mathematics of Operations Research 22.1 (1997): 222-255.
Chu, et al., "Contextual bandits with linear payoff functions," In International Conference on Artificial Intelligence and Statistics, pp. 208-214 (2011).
Filippi, et al., "Optimism in reinforcement learning and Kullback-Leibler divergence." Communication, Control, and Computing (Allerton), 2010 48th Annual Allerton Conference on. IEEE, 22 pages (2010).
Gittins, "Bandit processes and dynamic allocation indices." Journal of the Royal Statistical Society. Series B (Methodological) (1979): 148-177.
Honda and Takemura, "An asymptotically optimal policy for finite support models in the multiarmed bandit problem." Machine Learning 85.3 (2011): 361-391.
Katehakis et al., "Sequential choice from several populations." Proceedings of the National Academy of Sciences of the United States of America 92.19 (1995): 8584-8585.
Katehakis et al., "The multi-armed bandit problem: decomposition and computation." Mathematics of Operations Research 12.2 (1987): 262-268.
Lai et al., "Asymptotically efficient adaptive allocation rules." Advances in applied mathematics 6.1 (1985): 4-22.
Langford and Zhang, "The epoch-greedy algorithm for multi-armed bandits with side information." In Advances in neural information processing systems, 8 page (2008).
Drtner, "Online regret bounds for Markov decision processes with deterministic transitions." Theoretical Computer Science 411.29 (2010): 2684-2695.
Perchet et al., "The multi-armed bandit problem with covariates." The Annals of Statistics, 41(2), 30 pages (2013).
Press, "Bandit solutions provide unified ethical models for randomized clinical trials and comparative effectiveness research." Proceedings of the National Academy of Sciences 106, No. 52 (2009): 22387-22392.
Ke, Yan, et al., "Efficient Near-duplicate Detection and Sub-image Retrieval", MM'04, Oct. 10-16, 2004, New York, 8 pages.
"Machine Learning", Wikipedia, http://en.wikipedia.org/wiki/Machine_learning, found on-line on Jul. 23, 2014, 7 pages.
"Search by Image—Inside Search—Google", http://www.google.com/insidesearch/features/images/searchbyimage.html, downloaded from internet on May 14, 2014, 3 pages.
"TinEye Reverse Image Search", http://www.tineye.com/, downloaded from the internet on May 14, 2014, 2 pages.
Krizhevsky, Alex, et al., "ImageNet Classification with Deep Convolutional Neural Networks", Advances in Neural Information Processing Systems 25 (NIPS 2012), Lake Tahoe, Nevada, Dec. 3-6, 2012, 9 pages.
Bengio, Yoshua, "Learning Deep Architectures for AI", Foundations and Trends in Machine Learning, vol. 2, No. 1, published Nov. 15, 2009, pp. 1-71.
Boulton, Clint, "Google Image Swirl Renders Results Like Google Wonder Wheel", http:/www.eweek.com/search-engines/google image-swirl-renders-results-like google-wo . . . , posted on Nov. 17, 2009, 8 pages.
Dasgupta, Sanjoy, "Performance Guarantees for Hierarchical Clustering", Conference on Computational Learning Theory, Sydney, Australia, Jul. 8-10, 2002, pp. 351-363, 12 pages.
Van Leuken, Reinier H., et al., "Visual Diversification of Image Search Results", WWW '09 Proceedings of the 18th International Conference on World Wide Web, Apr. 20-24, 2009, Madrid, Spain, p. 341-350.
Tenenbaum, Joshua B., et al., "A Global Geometric Framework for Nonlinear Dimensionality Reduction", Science, vol. 290, Dec. 22, 2000, p. 2319-2323.
"Tf-idf", Wikipedia, http://en.wikipedia.org/wiki/Tf%E2%80%93idf, downloaded from internet on May 14, 2014, 4 pages.
Min, Renqiang, et al., "Deep Supervised t-Distributed Embedding", Proceedings of the 27th International Conference on Machine Learning, Haifa, Israel, Jun. 21-24, 2010, 8 pages.
"Bag-of-words model", Wikipedia, http://en.wikipedia.org/wiki/Bag-of-words_model, downloaded from the internet on May 14, 2014, 4 pages.
Cortes, Corinna, et al., "Algorithms for Learning Kernels Based on Centered Alignment", Journal of Machine Learning Research 13, published Mar. 2012, pp. 795-828.
Haussler, David, "Convolution Kernels on Discrete Structures", UCSC-CRL-99-10, University of California at Santa Cruz, Jul. 8, 1999, 38 pages.
Moreno, Pedro J., et al., "A Kullback-Leibler Divergence Based Kernel for SVM Classification in Multimedia Applications", in Advances in Neural Information Processing Systems 16, MIT Press, Jan. 9, 2004, 8 pages.
Lodhi, Huma, et al., "Text Classification using String Kernels", Journal of Machine Learning Research, vol. 2, published Feb. 2002, pp. 419-444.
Siddiquie, Behjat, et al., "Combining Multiple Kernels for Efficient Image Classification", Applications of Computer Vision (WACV), 2009 Workshop on, IEEE, Snowbird, Utah, Dec. 7-9, 2009, 8 pages.
"Reproducing kernel Hilbert space", Wikipedia, http://en.wikipedia.org/wiki/Reproducing_kernel_Hilbert_space, downloaded from the internet on May 14, 2014, 6 pages.
Hoi, Steven C.H., "Semi-Supervised Distance Metric Learning for Collaborative Image Retrieval", Computer Vision and Pattern Recognition, 2008, IEEE Conference on, Jun. 23-28, 2008, Anchorage, Alaska, 7 pages.
Yu, Jie, et al., "A New Study on Distance Metrics as Similarity Measurement", 2006 IEEE International Conference on Multimedia and Expo, Jul. 9-12, 2006, Toronto, Ontario, Canada, pp. 533-536, 4 pages.
Rubner, Yossi, et al., "The Earth Mover's Distance as a Metric for Image Retrieval", Stanford University, Department of Computer Science, Report No. CS-TN-98-86, Sep. 1998, pp. 1-20.

(56) References Cited

OTHER PUBLICATIONS

Vadivel, A., et al., "Performance Comparison of Distance Metrics in Content-based Image Retrieval Applications", Proceedings of International Conference on Information Technology, Jan. 2003, pp. 159-164, 6 pages.
"String metric", Wikipedia, http://en.wikipedia.org/wikii/String_metric, downloaded from the internet on May 14, 2014, 4 pages.
"Levenshtein distance", Wikipedia, http://en.wikipedia.org/wiki/Levenshtein_distance, downloaded from the internet on Jul. 23, 2014, 7 pages.
"Faceted search", Wikipedia, http://en.wikipedia.org/wiki/Faceted_search, downloaded from the internet on May 14, 2014, 3 pages.
"Document retrieval", Wikipedia, http://en.wikipedia.org/wiki/Document_retrieval, downloaded from the internet on May 14, 2014, 4 pages.
"Web search engine", Wikipedia, http://en.wikipedia.org/wiki/Web_search_engine, downloaded from the internet on May 14, 2014, 8 pages.
Yang, Jing, et al., "Semantic Image Browser Bridging Information Visualization with Automated Intelligent Image Analysis", Proc. IEEE Symposium on Visual Analytics Science and Technology (2006), Oct. 31-Nov. 2, 2006, Baltimore, MD, USA, 8 pages.
Kennedy, Lyndon, et al., "Generating Diverse and Representative Image Search Results for Landmarks", WWW 2008/Refereed Track: Rich Media, Apr. 21-25, 2008, Beijing, China, p. 297-306.
Schikuta, Erich, "Grid-Clustering" A Fast Hierarchical Clustering Method for very Large Data Sets, Center for Research on Parallel Computing, Rice University, Houston, Texas, CRPC-TR93358, Nov. 1993, 18 pages.
Cai, Deng, et al., "Hierarchical Clustering of WWW Image Search Results Using Visual, Textual and Link Information", MM'04, Oct. 10-16, 2004, New York, NY, 8 pages.
"Faceted search", Wikipedia, http://en.wikipedia.org/w/index.php?oldid=593937971, downloaded from the internet on May 12, 2014, 3 pages.
"Linear regression", Wikipedia, http://en.wikipedia.org/wiki/Linear_regression, downloaded from internet on Jul. 23, 2014, 20 pages.
"Simplex", Wikipedia, http://en.wikipedia.org/wiki/Simplex, downloaded from internet on Jul. 23, 2014, 12 pages.
"Constrained optimization", Wikipedia, http:/en.wikipedia.org/wiki/Constrained_optimization, downloaded on Jul. 23, 2014, 4 pages.
"Nonlinear dimensionality reduction", Wikipedia, http://en.wikipedia.org/wiki/Nonlinear_dimensionality_reduction, downloaded on Jul. 23, 2014, 15 pages.
"Manifold", Wikipedia, http://en.wikipedia.org/wiki/Manifold, downloaded on Jul. 23, 2014, 24 pages.
Hinton, Geoffrey and Roweis, Sam, "Stochastic Neighbor Embedding", Advances in Neural Information Processing Systems 15, Dec. 9-14, 2002, pp. 833-840, MIT Press, 8 pages.
"Multidimensional scaling", Wikipedia, http://en.wikipedia.org/wiki/Multidimensional_scaling, downloaded from the Internet on Jul. 23, 2014, 7 pages.
"Metric space", Wikipedia, http://en.wikipedia.org/wiki/Metric_space, downloaded from the internet on Jul. 23, 2014, 14 pages.
"Vector space", Wikipedia, http://en.wikipedia.org/wiki/Vector_space, downloaded from the internet on Jul. 23, 2014, 14 pages.
Lanckriet, Gert R.G., et al., "Learning the Kernel Matrix with Semidefinite Programming", Journal of Machine Learning Resarch 5, published Jan. 2004, pp. 27-72.
Souza, Cesar, "Kernel Functions for Machine Learning Applications", http://crsouza.blogspot.com/2010/03/kernel-functions-for-machine-learning.html, posted Mar. 17, 2010, 19 pages.
Collins et al., "Convolution Kernels for Natural Language", Advances in Neural Information Processing 14, 2001, MIT Press, pp. 625-632, 8 pages.
"String kernel", Wikipedia, http://en.wikipedia.org/wiki/String_kernel, downloaded from the internet on Jul. 23, 2014, 3 pages.
"Radial basis function kernel", Wikipedia, http://en.wikipedia.org/wiki/RBF_kernel, downloaded from the internet on Jul. 23, 2014, 3 pages.
"Polynomial kernel", Wikipedia, http://en.wikipedia.org/wiki/Polynomial_kernel, downloaded from the internet on Jul. 23, 2014, 2 pages.
"Kernel method", Wikipedia, http://en.wikipedia.org/wiki/Kernel_method, last modified Jun. 15, 2014, 4 pages.
"Bregman divergence", Wikipedia, http://en.wikipedia.org/wiki/Bregman_divergence, last modified on Mar. 20, 2014, 4 pages.
EP 15760512-2—Invitation Pursuant to Rule 137(4) dated Sep. 12, 2019, 2 pages.
EP 15760512-2—Response to Invitation Pursuant to Rule 137(4) dated Sep. 12, 2019 filed Oct. 4, 2019, 7 pages.
U.S. Appl. No. 15/295,930—Notice of Allowance dated Nov. 14, 2019, 15 pages.
EP 15760512.2—Rule 71(3) Intention to Grant dated Dec. 6, 2019, 150 pages.
CN 201580038513.4—First Office Action dated Mar. 27, 2020 w/English Translation, 13 pages.
U.S. Appl. No. 15/295,926—Final Office Action dated Oct. 28, 2020, 27 pages.
CN 201580038513.4—Notice of Allowance dated Nov. 24, 2020 w/English Translation, 5 pages.
CN 201580038513.4—Response to Office Action filed Oct. 10, 2020 w/English Translation, 57 pages.
CN 201580038513.4—First Office Action dated Mar. 27, 2020 w/English Translation, 14 pages.
Haussler, David, "Convolution Kernels on Discrete Structures", Ucsc-Crl-99-10, University of California at Santa Cruz, 8 Jul. 1999, 38 pp.
Ortner, "Online regret bounds for Markov decision processes with deterministic transitions." *Theoretical Computer Science* 411.29 (2010): 2684-2695.
Rigollet, et al., "Nonparametric bandits with covariates." *arXiv preprint arXiv: 1003. 1630*, 18 pages (2010).
Robbins, "Some aspects of the sequential design of experiments." In *Herbert Robbins Selected Papers*, pp. 527-535 (1952).
Scott, "A modern Bayesian look at the multi-armed bandit." *Applied Stochastic Models in Business and Industry* 26.6 (2010): 639-658.
Slivkins, "Contextual bandits with similarity information." The Journal of Machine Learning Research 15.1, 30 pages (2014).
Tewari and Bartlett, "Optimistic linear programming gives logarithmic regret for irreducible MDPs." *Advances in Neural Information Processing Systems*, 8 pages (2008).
Tokic, "Adaptive ϵ-greedy exploration in reinforcement learning based on value differences." *KI 2010: Advances in Artificial Intelligence*. Springer Berlin Heidelberg, 8 pages (2010).
Tokic et al., "Value-difference based exploration: adaptive control between epsilon-greedy and softmax." *KI 2011: Advances in Artificial Intelligence*. Springer Berlin Heidelberg, 12 pages (2011).
Valko, et al. "Finite-time analysis of kernelised contextual bandits." *arXiv preprint arXiv: 1309. 6869*, 10 pages (2013).
Vermorel et al., "Multi-armed bandit algorithms and empirical evaluation." *Machine Learning: ECML 2005*. Springer Berlin Heidelberg, 2005. 437-448.
Walsh, et al., "Exploring compact reinforcement-learning representations with linear regression," In Proceedings of the Twenty-Fifth Conference on Uncertainty in Artificial Intelligence, AUAI Press, pp. 591-598 (2009).
Weber, "On the Gittins index for multiarmed bandits." *The Annals of Applied Probability* 2.4 (1992): 1024-1033.
"Package 'WeightedCluster'", https://cran.r-project.org/web/packages/WeightedCluster/WeightedCluster.pdf. accessed Dec. 8, 2016, 16 pages.
"Bayes' Theorem", Wikipedia, https://en.wikipedia.org/wiki/Bayes%27_theorem, accessed Nov. 11, 2016, 12 pages.
"Thompson sampling", Wikipedia, https://en.wikipedia.org/wiki/Thompson_sampling, accessed Dec. 8, 2016, 4 pages.
Cristianini, Nello, "Kernel Methods for General Pattern Analysis", nello@support-vector.net, accessed Oct. 11, 2016, 77 pages.
"Random projection", Wikipedia, https://en.wikipedia.org/wiki/Random_projection, acessed Mar. 7, 2016, 2 pages.
"Metropolis-Hastings algorithm", Wikipedia, https: //en.wikipedia.org/wiki/Metropolis%E2%80%93Hastings_algorithm, accessed Mar. 7, 2016, 8 pages.

(56) References Cited

OTHER PUBLICATIONS

"Markov chain Monte Carlo", Wikipedia, https://en.wikipedia.org/wiki/Markov_chain_Monte_Carlo, accessed Mar. 7, 2016, 6 pages.
Studer, "WeightedCluster Library Manual: A practical guide to creating typologies of trajectories in the social sciences with R," *LIVES Working Papers*, 24 pages (2013).
Agrawal et al., "Analysis of Thompson Sampling for the multi-armed bandit," J MLR: Workshop and Conference Proceedings vol. 23 (2012). 26 pages.
Herbster et al., "Tracking the Best Linear Predictor, Journal of Machine Learning Reseaarch," Sep. 2001, 29 pages.
Herbster et al, Tracking the Best Expert, Machine Learning, 32, 1998, 28 pages.
Chapelle et al, "An empirical evaluation of thompson sampling," *Advances in neural information processing systems*. 2011, 9 pages.
PCT/IB16/057510—International Search Report and Written Opinion dated Apr. 12, 2017, 22 pages.
GB 1621341.5—Voluntary Amendment dated Feb. 23, 2017, 47 pages.
PCT/IB2016/001590—International Search Report and Written Opinion dated May 11, 2017, 11 pages.
Stasko, et al., "Jigsaw: Supporting Investigative Analysis Through Interactive Visualization." Information Visualization 7.2 (2008): 118-132.
U.S. Appl. No. 14/494,364—Office Action dated Jun. 2, 2017, 61 pages.
CN 201580038513.4—Request for Examination filed May 15, 2017, 132 pages.
EP 15760512.2—Response to Rule 161(1) EPC Communication dated Jan. 27, 2017 filed Jul. 27, 2017, 56 pages.
PCT/IB16/01593—International Search Report and Written Opinion dated May 22, 2017, 14 pages.
U.S. Appl. No. 14/494,364—Response to Office Action dated Jun. 2, 2017, filed Nov. 2, 2017, 25 pages.
U.S. Appl. No. 15/373,897—Office Action dated Nov. 9, 2017 12 pages.
JP 2017-545913—Request for Examination and Amendment filed Jan. 18, 2018, 42 pages.
U.S. Appl. No. 14/494,364—Final Office Action dated Feb. 5, 2018, 38 pages.
U.S. Appl. No. 15/373,897—Response to Office Action dated Nov. 9, 2017, filed Apr. 3, 2018, 35 pages.
U.S. Appl. No. 15/373,897—Notice of Allowance dated Jun. 11, 2018, 29 pages.
U.S. Appl. No. 14/494,364—Response to Final Office Action dated Feb. 5, 2018, filed May 1, 2018, 33 pages.
U.S. Appl. No. 14/494,364—Office Action dated Jun. 27, 2018, 31 pages.
PCT/IB16/057510—International Preliminairy Report on Patentabilitu (Chap 1) dated Jun. 21, 2018, 13 pages.
PCT/IB16/01593—International Preliminary report on Petentability (Chap 1) dated Apr. 26, 2018, 9 pages.
EP 15760512-2—First Office Action dated Feb. 1, 2019, 8 pages.
"Use GMail offline with Google Gears", Internet Citation, XP002585516, retrieved from the Internet: URL:http://geniushackers.com/blog/2009/01/28/use-gmail-offline-with-google-gears/, Jan. 28, 2009, pp. 1-6.
EP 15760512-2—Response to First Office Action dated Feb. 1, 2019, as filed Jun. 6, 2019, 8 pages.
Tokic, "Adaptive ?-greedy exploration in reinforcement learning based on value differences." KI 2010: Advances in Artificial Intelligence. Springer Berlin Heidelberg, 8 pages (2010).
Tokic et al., "Value-difference based exploration: adaptive control between epsilon-greedy and soflinax." KI 2011: Advances in Artificial Intelligence. Springer Berlin Heidelberg, 12 pages (2011).
"Package 'WeightedCluster'", https://cran.r-project.org/web/packages/WeightedCluster/WeightedCluster.pdf. accessed Dec. 3, 2016, 16 pages.
U.S. Appl. No. 15/311,163—Office Action dated Dec. 26, 2018, 47 pages.
U.S. Appl. No. 15/311,163—Response to Office Action dated Dec. 26, 2018 filed Mar. 26, 2019, 18 pages.
U.S. Appl. No. 15/311,163—Notice of Allowance dated Apr. 19, 2019, 12 pages.
U.S. Appl. No. 15/311,163—Notice of Allowance dated Jul. 29, 2019, 10 pages.
U.S. Appl. No. 15/295,930—Office Action dated Apr. 24, 2019, 8 pages.
U.S. Appl. No. 15/295,930—Response to Office Action dated Apr. 24, 2019 filed Aug. 26, 2019, 14 pages.

\* cited by examiner

VISUAL INTERACTIVE SEARCH

CROSS-REFERENCE TO OTHER APPLICATIONS

This application is a continuation of U.S. Nonprovisional application Ser. No. 15/311,163, entitled, "VISUAL INTERACTIVE SEARCH," by Nigel Duffy filed 14 Nov. 2016, which is a 371 of PCT International Application No: PCT/IB2015/001267, entitled "VISUAL INTERACTIVE SEARCH", by Nigel Duffy filed 4 May 2015, which is a continuation-in-part of U.S. application Ser. No. 14/494,364, entitled "VISUAL INTERACTIVE SEARCH," by Nigel Duffy, filed 23 Sep. 2014, which claims the benefit under 35 U.S.C. 119(e) of U.S. provisional application No. 61/994,048, entitled "VISUAL INTERACTIVE SEARCH," by Nigel Duffy filed 15 May 2014. PCT International Application No: PCT/IB2015/001267, entitled "VISUAL INTERACTIVE SEARCH", by Nigel Duffy filed 4 May 2015, also claims the benefit under 35 U.S.C. 119(e) of U.S. provisional application No. 61/994,048, entitled "VISUAL INTERACTIVE SEARCH," by Nigel Duffy filed 15 May 2014. The above applications are hereby incorporated by reference for all purposes.

BACKGROUND

The invention relates generally to a tool for searching for digital documents in an interactive and visual way. Examples of digital documents include: photographs, product descriptions, or webpages. For example this tool may be used on a mobile device to search for furniture available for sale via an online retailer.

More specifically, this invention relates to document retrieval with relevance feedback.

Current computer search technologies allow users to perform queries and respond to those queries with an ordered list of results. The queries may be in the form of a structured query language, natural language text, speech, or a reference image. However, the results returned often do not satisfy the user's search goal. The user then proceeds to refine or modify the query in an attempt to better achieve desired goals.

SUMMARY

The system described herein addresses this challenge using a novel, iterative search technique with relative feedback.

Roughly described, a database in which a catalog of documents to be searched has been embedded into an embedding space. The database identifies a distance between each pair of the documents in the embedding space corresponding to a predetermined measure of dissimilarity between the pair of documents. The user is presented with an initial (i=0) collection of N0>1 candidate documents from an initial (i=0) candidate space within the embedding space, the initial collection having fewer documents than the initial candidate space. The initial candidate space can be established on the basis of an initial search query, which may be textual, verbal, or visual, e.g., via a prototype image. Then, for each i'th iteration, beginning with a first iteration (i=1), the user selects an i'th selected subset of the documents from the then-current collection of documents (called the (i−1)'th collection of documents), and in response to the selection the system geometrically constrains the embedding space to identify an i'th candidate space such that the documents in the i'th candidate space are collectively closer in the embedding space to the documents in the i'th selected subset, than are the documents in the (i−1)'th candidate space. The system presents the user with an i'th collection of Ni>1 candidate documents from the i'th candidate space, and the process repeats with the next iteration in which the user selects a new subset of the documents from the then-current collection with which the user was presented. Eventually the user is satisfied with one or more of the documents in a then-current collection, and the system takes action with the document(s) in response. In this way the user can interactively refine a search in order to more precisely encode intended search goals.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In an embodiment of the invention, a system can have several aspects, and different embodiments need not implement all of them: 1) a module for creating an initial query, 2) a module for obtaining a set of candidate results satisfying the initial query, 3) a module for determining the distance or similarity between candidate results or a module for embedding the candidate results in a vector space, 4) a module for sub-selecting a discriminating set of candidate results, 5) a module for arranging candidate results in 2 dimensions, 6) a module for obtaining user input with regard to the candidate results, 7) a module for refining the search query to incorporate information regarding the user input encoded as geometric or distance constraints with respect to the embedding or distance measures of 3, 8) a module for iteratively obtaining a set of candidate results satisfying the initial query and the geometric or distance constraints accumulated from user input.

Figure 8:
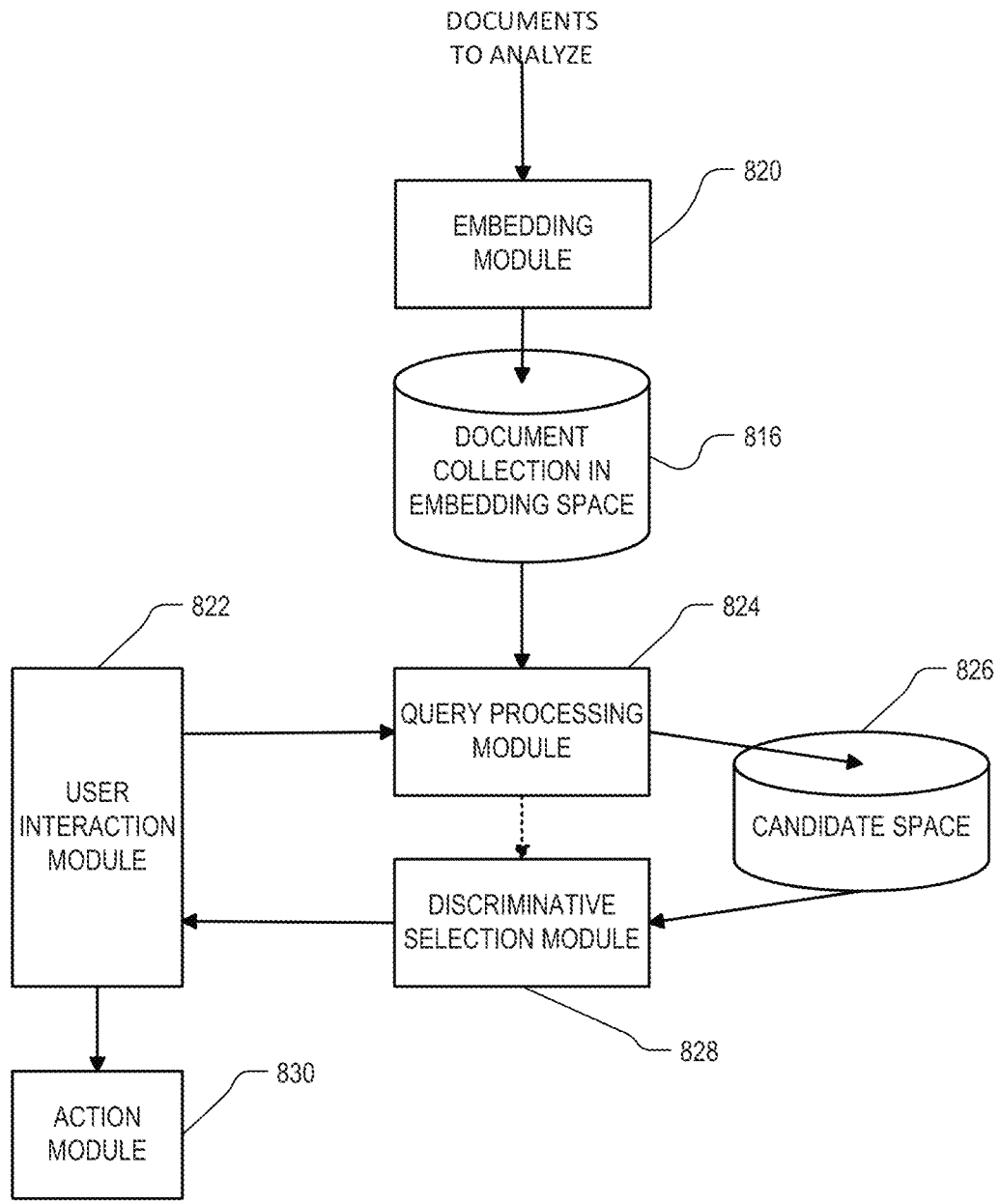
FIG. 8 is a block diagram of various components of an embodiment of a system according to the invention.

FIG. 8 is a block diagram of various components of an embodiment of a system according to the invention. It includes an embedding module 820 which calculates an embedding of the source documents into an embedding space, and writes the embedding information, in association with identification of the documents, into a document catalog database 816. A user interaction module 822 receives queries and query refinement input (such as relevance feedback) from a user, and provides them to a query processing module 824. In one embodiment the user interaction module 822 includes a computer terminal, whereas in another embodiment it includes only certain network connection components through which the system communicates with an external computer terminal. The query processing module 824 interprets the queries as geometric constraints on the embedding space, and narrows or otherwise modifies the catalog to develop a set of candidate documents which satisfy the geometric constraints. These are written into a candidate space database 826. Candidate spaces as used herein are also embedding spaces, and for example may constitute a portion of the embedding space of catalog 816. In some embodiments query processing module may also perform a re-embedding of the candidate documents in embedding space. A discriminative selection module 828 then selects a discriminative set of the documents from the candidate space 826 and presents them to the user via user interaction module 822. User interaction module 822 may then receive further refinement queries from the user, which are handled as above, or it may receive a user commit indication, in which case the system takes some action 830 with respect to the user's selected document such as opening the document for the user, engaging in further search refinement, processing the user's selected document as an order for a product represented by the document, processing the user's selected document as an order for delivery of a digital product represented by the document, processing the user's selected document as an order for a product represented by the document to be manufactured and shipped, or processing the user's selected document as a request for sharing with others digital content represented by the document.

Note that in some embodiments the user refinement input may not require a further geometric constraint on the candidate space, but rather may involve only selection of a different discriminative set of documents from the existing candidate space 826 for presentation to the user. Also, in various embodiments, the candidate space database may not be implemented as a separate database, but rather may be combined in various ways with the document catalog embedding space 816. Candidate space may also be implied rather than physical in some embodiments.

Figure 9:
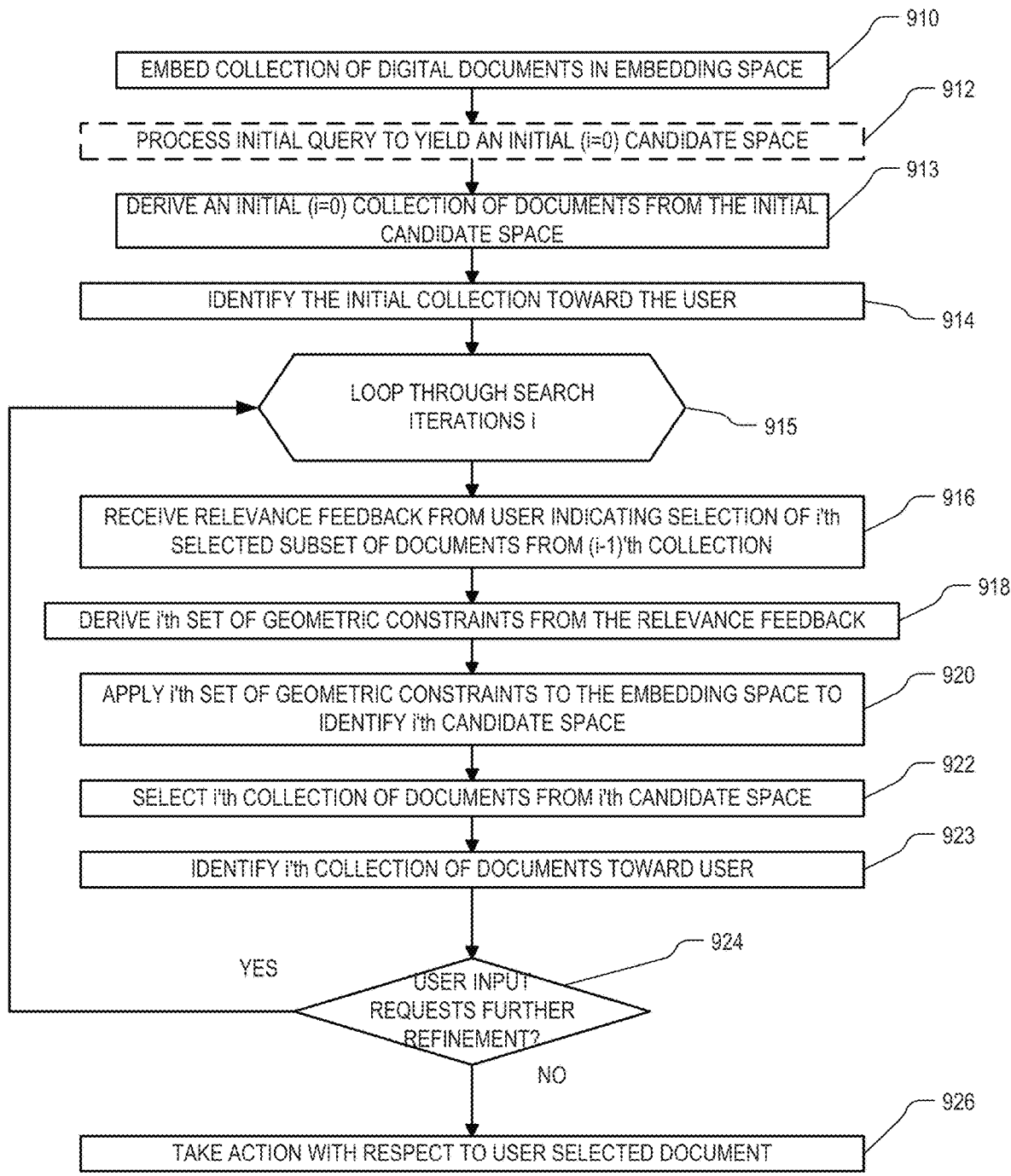
FIG. 9 is a flow chart illustrating various logic phases through which a system according to the invention may proceed.

FIG. 9 is a flow chart illustrating various logic phases through which a system according to the invention may proceed. Initially, in step 910, a catalog of digital documents (which, as used herein includes images, text, web-pages, catalog entries, and sections of documents) is embedded in an embedding space and stored in a database. Though this group of documents is referred to herein as a "catalog", the use of that term is not intended to restricted the group to documents that might be found in the type of catalog that a retail store might provide. In the database, a distance is identified between each pair of the documents in the embedding space corresponding to a predetermined measure of dissimilarity between the pair of documents. In step 912, an initial query is optionally processed to yield an initial candidate space of documents satisfying the query results. The initial query may be a conventional text query, for example. The initial candidate space is within and optionally smaller than the full catalog of documents. In step 913 an initial collection of digital documents is derived from the initial candidate space. This initial collection of documents is a subset of the initial candidate space. (As used herein, the term "subset" refers only to a "proper" subset.) The initial candidate space is sometimes referred to herein as an "i=0" candidate space, for convenient description hereinafter of the iterative search process. Similarly, the initial collection of documents is sometimes referred to herein as an "i=0" collection. In one embodiment the initial collection of documents is selected as a discriminative subset of the catalog, while in another embodiment the initial collection of documents is not discriminative. In step 914, the initial collection of documents is identified toward the user. In one embodiment this can include displaying a representation of the documents in the initial collection visibly to the user.

In step 915 an iterative search process is begun. For convenience of description, the iterations are numbered herein consecutively beginning with iteration 1, and in general each iteration is iteration number 'i'. Reference is sometimes made to a 0'th iteration, which refers to the i=0 candidate space and the i=0 collection of documents.

Before the beginning of the i'th iteration, the user is presented with a collection of documents from the prior iteration (i−1). If i=1, then this collection of documents is the initial (i=0) collection of documents from step 914. If i>1, then this collection of documents is the (i−1)'th collection of documents as presented to the user in step 923 of the prior iteration.

At the beginning of the i'th iteration, in step 916, the user provides relative feedback as to the documents in the (i−1)'th collection of documents. Preferably the relative feedback takes the form of user selection of a subset of the documents from the (i−1)'th collection, where selection of a document implies that the user considers that document to be more relevant to a search target than unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset.

In step 918, a set of geometric constraints is derived from the relative feedback, in a manner described elsewhere herein. The set of geometric constraints derived in the i'th iteration is referred to as the i'th set of geometric constraints.

In step 920, the i'th set of geometric constraints is applied to the embedding space to form an i'th candidate space, and in step 922 an i'th collection of candidate documents is selected as a subset of the documents in the i'th candidate space. In one embodiment the i'th collection of documents is selected as a discriminative subset of the i'th candidate space, while in another embodiment the i'th collection of documents is not discriminative. In step 923 the i'th collection of documents is presented toward the user for optional further refinement. In step 924, if the user is satisfied with one of the candidate results, the user indicates to commit to that result. If the user input indicates further refinement, then the logic returns to step 915 for the next iteration of the search loop. If not, then in step 926 the system takes action with respect to the user-selected document.

Note that at least steps 910, 912 and 914 can happen in any order. In one embodiment, step 910 occurs continuously in the background, separately from the remainder of the steps, and updates the document catalog in embedding space asynchronously with the remainder of the steps.

In general, the logic of FIG. 9, as well as all sequences and flow charts herein, can be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart or phase in a logic sequence describes logic that can be implemented in hardware or in software running on one or more computing processes executing on one or more computer systems. In one embodiment, each step of the flow chart or phase in a logic sequence illustrates or describes the function of a separate module of software. In another embodiment, the logic of the step is performed by software code routines which are distributed throughout more than one module. In addition, as the term is used herein, a "module" can include one or more "sub-modules", which are themselves considered herein to constitute "modules". As with all flowcharts and logic sequences herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts and logic sequences herein show only aspects that are pertinent to an understanding of the invention, and it will be understood that in a specific embodiment, numerous additional steps for accomplishing other functions for that embodiment can be performed before, after and between those steps shown.

In some embodiments, the development and maintenance of new or updated constraints is performed on a mobile device, whereas the document catalog in embedding space is maintained on a server which is separated from the mobile device by a network that includes a Wi-Fi or cellular data link or both. The overall arrangement still performs the steps of FIG. 9 (with its variations as described elsewhere herein), but the arrangement embodies a specific and highly advantageous allocation of functions among the two nodes. In particular, as pointed out elsewhere herein, the memory and computational resources required to maintain and update the constraints are minimal enough as to allow constraint management to be performed and maintained on a mobile device such as a phone or tablet, rather than on a server.

Figure 18:
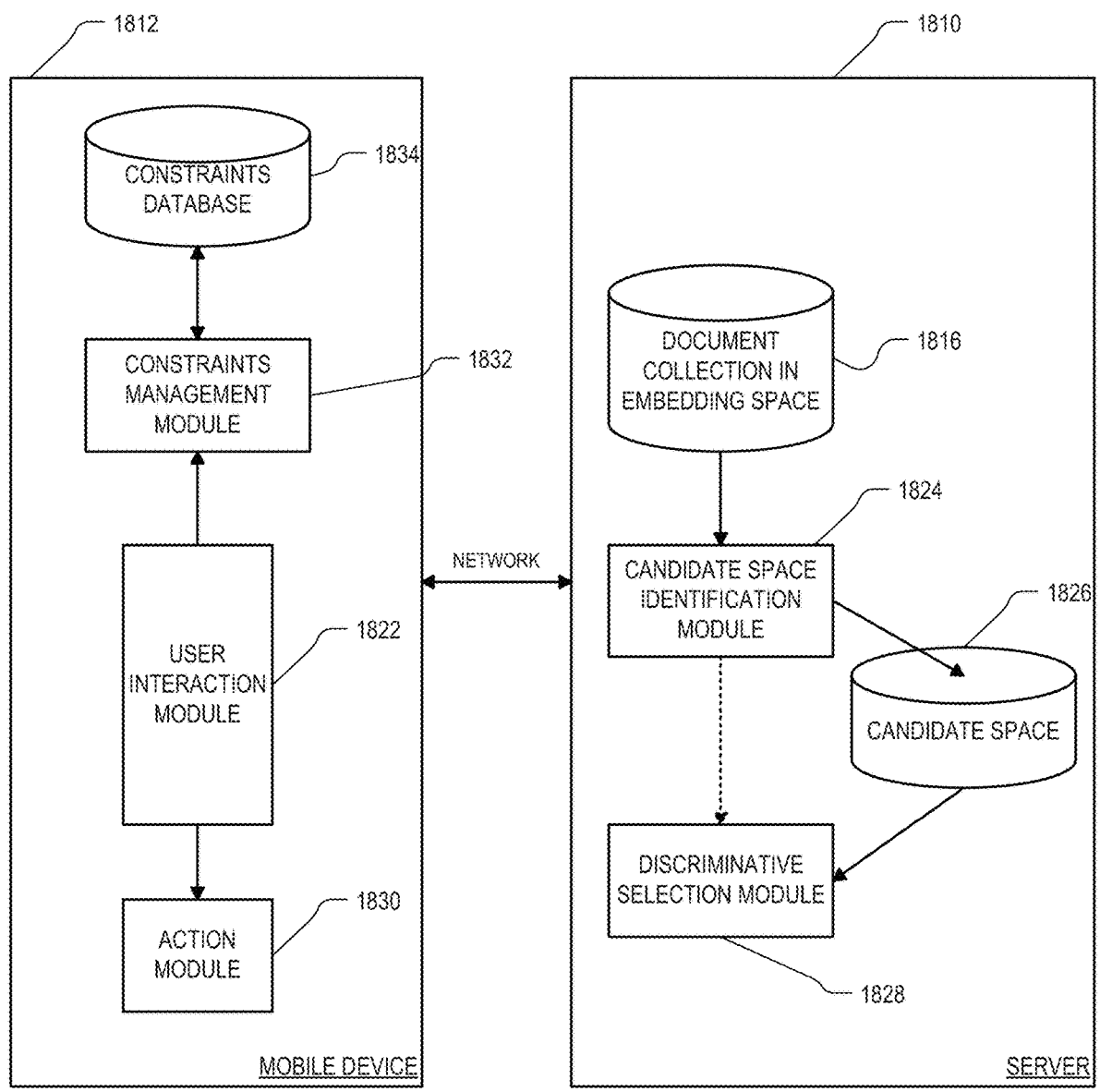
FIG. 18 is a block diagram of various components of a mobile device embodiment of a system according to the invention.

FIG. 18 is a block diagram of various components of such a mobile device embodiment of a system according to the invention. In this embodiment, a server 1810 has accessibly thereto the document catalog 1816 previously embedded into embedding space. The server 1810 also includes a candidate space identification module 1824, which has access to the document catalog 1816. The candidate space identification module determines the candidate space at each iteration of the search, by applying the initial query and the then-current set of constraints to the documents in the document catalog 1816. The resulting candidate space is stored temporarily into a candidate space database 1826. In an embodiment, candidate space database contains pointers to documents in the document catalog database 1816, rather than any actual documents. The server 1810 also optionally includes a discriminative selection module 1828, which selects a discriminative collection of the documents from the candidate space 1826 for transmission to a mobile device 1812.

The mobile device 1812 includes a user interaction module 1822, which presents collections of documents to the user at each iteration, and receives user feedback concerning the collection. User interaction module 1822 forwards the user feedback to a constraints management module 1832, which manages the content of a constraints database 1834. If user interaction module 1822 receives a user commit indication, it notifies an action module 1830 which takes some action with respect to the user's selected document such as the actions mentioned elsewhere herein with respect to FIG. 8.

Figure 17:
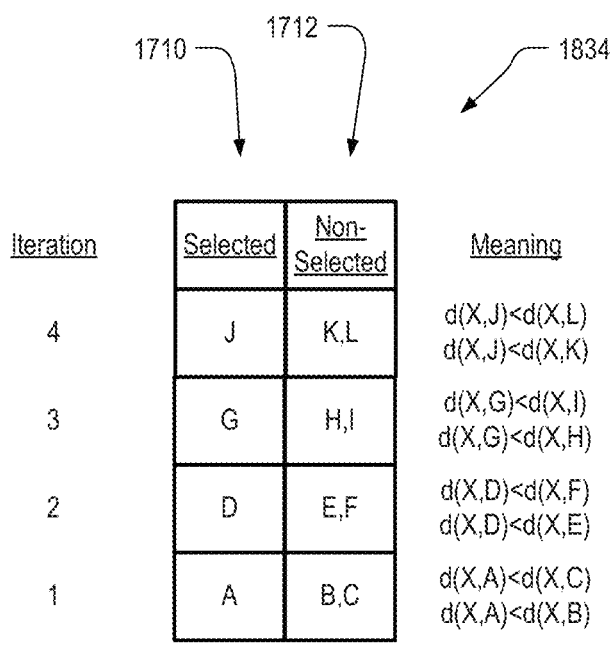
FIG. 17 illustrates the content of a constraints database in one embodiment.

FIG. 17 illustrates the content of constraints database 1834 in one embodiment. It contains a last-in-first-out stack, in which each level corresponds to a respective iteration of the search. Each i'th level stores sufficient information to identify the geometric constraints that resulted from the user's i'th iteration of feedback in response to viewing a collection of documents that were presented to the user. In one embodiment, all the constraints in effect for each iteration of the search are described in the stack entry for that iteration. In another embodiment, where constraints are cumulative, only the set of constraints that were added in each iteration is described in the stack entry for that iteration, all other constraints applicable to that stack entry being implied due to their presence in stack entries corresponding to prior iterations. In general, each stack entry "identifies" the set of constraints applicable at the corresponding iteration.

In the embodiment of FIG. 17, the stack entry for each i'th iteration contains only two fields: one field 1710 identifying all of the documents in the i'th iteration that the user selected from a collection of documents with which the user was presented, and a second field 1712 identifying all of the documents that were presented to the user for the i'th iteration but which the user did not select. The documents identified in the first field 1710 are sometimes referred to herein as the i'th selected subset of documents, and the documents identified in the second field 1712 are sometimes referred to herein as the i'th non-selected subset of the documents that the user selected from a collection of documents. User selection of the i'th selected subset indicates that the user considers the documents selected as being more relevant to a target than the documents in the i'th non-selected subset.

In the embodiment of FIG. 17 it is assumed, for clarity of illustration, that only three documents were presented to the user at each iteration, and that the user selected only one of them. For iteration 1 the user was presented with documents A, B and C, and the user selected document A. For iteration 2 the user was presented with documents D, E and F, and the user selected document D. For iteration 3 the user was presented with documents G, H and I, and the user selected document G. For iteration 4 the user was presented with documents J, K and L, and the user selected document J. The system interprets each entry to define a separate geometric constraint for each pair of documents identified in the corresponding level of the stack, where one document of the pair is identified in the first field 1710 and the other document of the pair is identified in the second field 1712. Thus level 1 of the stack defines a constraint using the pair (A,B) and another constraint using the pair (A,C). Level 2 of the stack defines a constraint using the pair (D,E) and another constraint using the pair (D,F), and so on. The actual constraint is that a candidate document X, in order to satisfy the constraint, must be closer in the embedding space to the first document of the pair than it is to the second document of the pair. Thus level 1 of the stack defines the constraints that a candidate document X must be closer to A in the embedding space than it is to B, and also closer to A in the embedding space than it is to C. These constraints are abbreviated for purposes of the present discussion as $$d(X,A)<d(X,C) \text{ and } d(X,A)<d(X,B),$$

where 'd' means distance in the embedding space. Similarly, level 2 of the stack defines the constraints that candidate document X must be closer to D in the embedding space than it is to E, and also closer to D in the embedding space than it is to F. These constraints are abbreviated for purposes of the present discussion as $$d(X,D)<d(X,F) \text{ and } d(X,D)<d(X,E),$$

and so on. It can be seen that if the first field 1710 in iteration i identifies Pi documents, and the second field 1712 in iteration i identifies Qi documents, then the contents of each iteration i define a total of Pi*Qi constraints, one for each combination of a document in the first field 1710 and a document in the second field 1712. It will be appreciated that other ways of representing the constraints added in each iteration can be used in different embodiments.

Figure 16:
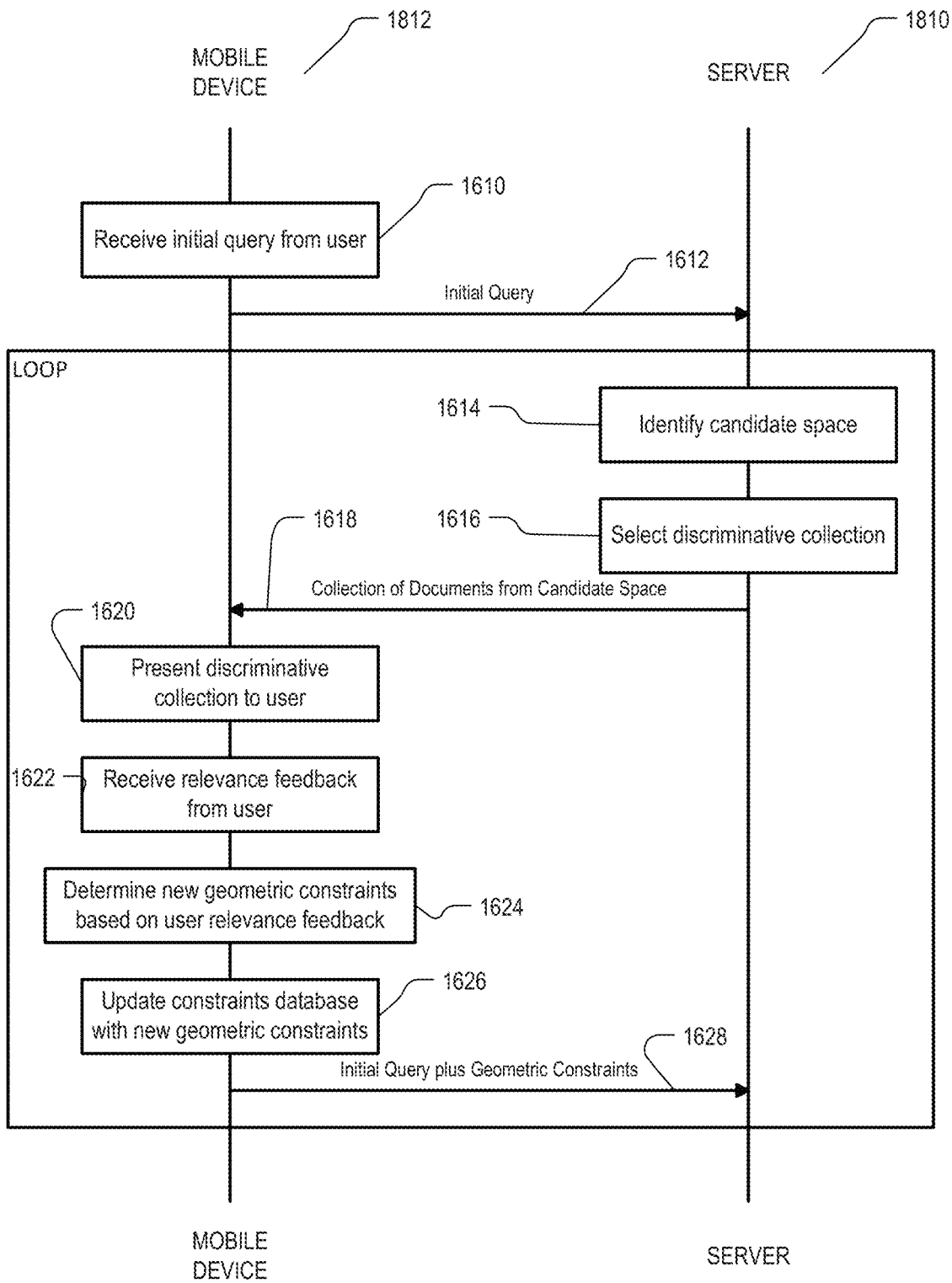
FIG. 16 is a diagram illustrating messages that pass between the mobile device and the server in the embodiment of FIG. 18

FIG. 16 is a diagram illustrating the primary types of messages that pass between the mobile device and the server in the embodiment of FIG. 18. In this embodiment, the mobile device 1812 acts as a client to server 1810. It manages the interactions with the user and updates and maintains the constraints in constraints database 1834. The server 1810 maintains the catalog but retains no state with regard to the user's search (although it may log it for later off-line processing).

Initially, in box 1610, the mobile device 1812 receives an initial query from the user via user iteration module 1822. In message 1612 it forwards the initial query to the server 1810. In box 1614 the candidate space identification module 1824 in the server 1810 applies the query to the document collection 1816 to determine an initial candidate space. In box 1616 the discriminative selection module 1828 in the server 1810 determines a discriminative collection of the documents from the then-current candidate space, though in another embodiment, the collection selected in box 1616 need not necessarily be discriminative. By message 1618, the server 1810 returns the selected collection to the client mobile device 1812 and discards the constraints or query that it used in boxes 1614 and 1616. The message 1618 includes all information necessary for presentation to the user and maintenance of the constraints, such as document images, meta-data about the documents, and an indication of their embedding in the embedding space. In box 1620 the mobile device 1812 presents the collection to the user, for example by displaying an image of each document. In box 1622 the mobile device 1812 receives relative feedback from the user, in the form of user selection of one or more of the documents that were presented to the user in box 1620. In box 1624 the constraints management module 1832 determines new geometric constraints based on the user's feedback, and in box 1626 it updates the constraints database 1834 with the new constraints. In message 1628, the mobile device 1812 then sends the then-current set of constraints from the constraints database 1834 (which contain all relevant information about the search state) to the server, together with the initial query from box 1610. The process now loops back to box 1614 with the server 1810 applying the initial query and the then-current set of geometric constraints to the document collection 1816 to derive the next candidate space.

As can be seen, the server 1810 is stateless with regard to a given user's search. This has several benefits: 1) load on the servers is decreased, 2) it is easier to scale by adding more servers as each iteration of a query interaction could go to a different server, 3) since the server is stateless the system is more robust, so for example if a server fails the state is retained on the mobile device. Additionally, since the constraints stored in constraints database 1834 fully encode the user's feedback during the current and all prior search iteration, they require minimal storage and management.

As mentioned, message 1618 includes document images. Though these are typically not large, many caching schemes could be implemented that would retain catalog items on the client 1812. These include methods that cache popular items, or items that are predicted to be of interest to the user based on demographic information or search histories. Items could also be pre-fetched onto the client 1812 by predicting what items might need to be presented in later iterations of the search.

Embeddings of Digital Documents

The "embedding space", into which digital documents are embedded by embedding module 820 and in step 910, as used herein is a geometric space within which documents are represented. In one embodiment the embedding space is a vector space, in which the features of a document define its "position" in the vector space relative to an origin. The position is typically represented as a vector from the origin to the document's position, and the space has a number of dimensions based on the number of coordinates in the vector. Vector spaces deal with vectors and the operations that may be performed on those vectors. In another embodiment the embedding space is a metric space, which does not have a concept of position, dimensions or an origin. Distances among documents in a metric space are maintained relative to each other, rather than relative to any particular origin. Metric spaces deal with objects combined with a distance between those objects and the operations that may be performed on those objects. For purposes of the current discussion these objects are significant in that there exist many efficient algorithms that operate on vector spaces and metric spaces. For example metric trees may be used to rapidly identify objects that are "close" to each other. In the discussion below we embed objects into vector spaces and/or metric spaces. In the context of a vector space this means that we define a function that maps objects to vectors in some vector space. In the context of a metric space it means that we define a metric (or distance) between those objects that allows us to treat the set of all such objects as a metric space. Note that vector spaces allow the use of a variety of standard measures of distance (divergence) including the Euclidean distance. Other embodiments can use other types of embedding spaces.

As used herein, "an embedding" is a map which maps documents into an embedding space. Typically it is a function which takes as inputs a potentially large number of characteristics of the document to be embedded. For some embeddings, the mapping can be created and understood by a human, whereas for other embeddings the mapping can be very complex and non-intuitive. In many embodiments the latter type of mapping is developed by a machine learning algorithm based on training examples, rather than being programmed explicitly.

Let us first consider embedding in a vector space. To embed a document catalog in a vector space we associate each document with a vector. The distance between two documents in such a space is then determined using standard measures of distance on vectors.

The goal of embedding digital documents in a vector space is to place intuitively similar documents close to each other. There are many ways to achieve this. For example a common way of embedding text documents is to use a bag-of-words model. The bag of words model maintains a dictionary. Each word in the dictionary is given an integer index, for example, the word aardvark may be given the index 1, and the word zebra may be given the index 60,000. Each document is processed by counting the number of occurrences of each dictionary word in that document. A vector is created where the value at the $i^{th}$ index is the count for the $i^{th}$ dictionary word. Variants of this representation normalize the counts in various ways. Such an embedding captures information about the content and therefor the meaning of the documents. Text documents with similar word distributions are close to each other in this embedded space.

There are a wide variety of means by which documents may be embedded into a vector space. For example images may be processed to identify commonly occurring features using, e.g., scale invariant feature transforms (SIFT), which are then binned and used in a representation similar to the bag-of-words embedding described above. Of particular interest are embeddings created using deep neural networks, or other deep learning techniques. For example a neural network can learn an appropriate embedding by performing gradient descent against a measure of dimensionality reduction on a large set of training data. As another example, one could learn a kernel based on data and derive a distance based on that kernel. Likewise one may learn a distance directly. These approaches generally use large neural networks to map documents, words, or images to high dimensional vectors. Alternatively, one may learn an embedding using examples with algorithms such as Multi-Dimensional Scaling, or Stochastic Neighbor Embedding. An embedding into a vector space may also be defined implicitly via a kernel. In this case the explicit vectors may never be generated or used, rather the operations in the vectors space are carried out by performing kernel operations in the original space.

Other embeddings of particular interest capture date and time information regarding the document, e.g., the date and time when a photograph was taken. In such cases a kernel may be used that positions images closer if they were taken on the same day of the week in different weeks, or in the same month but different years. For example, photographs taken around Christmas may be considered similar even though they were taken in different years and so have a large absolute difference in their timestamps. In general, such kernels may capture information beyond that available by simply looking at the difference between timestamps.

Similarly, embeddings capturing geographic information may be of interest. Such embeddings may consider geographic meta-data associated with documents, e.g., the geo-tag associated with a photograph. In these cases a kernel or embedding may be used that captures more information than simply the difference in miles between two locations. For example, it may capture whether the photographs were taken in the same city, the same building, or the same country.

Often embeddings will consider documents in multiple ways. For example, a product may be embedded in terms of the meta-data associated with that product, the image of that product, and the textual content of reviews for that product. Such an embedding may be achieved by developing kernels for each aspect of the document and combining those kernels in some way, e.g., via a linear combination.

In many cases a very high dimensional space would be required to capture the intuitive relationships between documents. In some of these cases the required dimensionality may be reduced by choosing to embed the documents on a manifold (curved surface) in the space rather than to arbitrary locations.

Finally, it is worth noting that different embeddings may be appropriate on different subsets of the document catalog. For example, it may be most effective to re-embed the candidate result sets at each iteration of the search procedure. In this way the subset may be re-embedded to capture the most important axes of variation or of interest in that subset.

To embed a digital document catalog in a metric space requires associating that catalog with a distance (or metric). Below we discuss a number of ways to define a distance between digital documents.

Distances and Similarities Between Digital Documents

"Distance" between two documents in embedding space "corresponds to" a predetermined measurement of dissimilarity among documents. Preferably it is a monotonic function of the measurement of dissimilarity. Typically it equals the measurement of dissimilarity. Example distances include the Manhattan distance, the Euclidean distance, and the Hamming distance.

There are a wide variety ways to measure the distance (or dissimilarity) between digital documents, and these may be combined to produce new measures of distance. An important concept is that the intuitive relationships between digital documents may be captured via such a similarity or distance measure. For example, some useful distance measures place images containing the same person in the same place close to each other. Likewise, some useful measures place documents discussing the same topic close to each other. Of course there are many axes along which digital documents may be intuitively related, so that the set of all documents close (with respect to that distance) to a given document may be quite diverse. For example, a historical text describing the relationship between Anthony and Cleopatra may be similar to other historical texts, texts about Egypt, texts about Rome, movies about Anthony and Cleopatra, and love stories. Each of these types of differences constitutes a different axis relative to the original historical text.

Such distances may be defined in a variety of ways. One typical way is via embeddings into a vector space. Other ways include encoding the similarity via a Kernel. By associating a set of documents with a distance we are effectively embedding those documents into a metric space. Documents that are intuitively similar will be close in this metric space while those that are intuitively dissimilar will be far apart. Note further that kernels and distance functions may be learned. In fact, it may be useful to learn new distance functions on subsets of the documents at each iteration of the search procedure.

Note that wherever a distance is used to measure the dissimilarity between documents a kernel may be used to measure the similarity between documents instead and vice-versa. In particular, in the sequel we will refer to the use of distances, e.g., in the definition of constraints. However, kernels may be used directly instead without the need to transform them into distances.

Kernels and distances may be combined in a variety of ways. In this way multiple kernels or distances may be leveraged. Each kernel may capture different information about a document, e.g., one kernel may capture visual information about a piece of jewelry, while another captures price, and another captures brand.

Also note that embeddings may be specific to a given domain, such as a given catalog of products or type of content. For example, it may be appropriate to learn or develop an embedding specific to men's shoes. Such an embedding would capture the similarity between men's shoes be would be uninformative with regard to men's shirts.

Database Organization

The databases used in an embodiment of the invention, such as databases 816 and 826, may use commonly available means to store the data in, e.g., a relational database, a document store, a key value store, or other related technologies. In each case the original document contents (or pointers to them) may be stored and associated with their high dimensional representation, or a set of measures of distance relative to other documents.

In order to achieve scalable and fast search performance indexing structures are critical. When documents are embedded in a vector space indexes may be built using, e.g., kd-trees. When documents are associated with a distance metric and hence embedded in a metric space metric trees may be used.

The databases described herein are stored on one or more non-transitory computer readable media. As used herein, no distinction is intended between whether a database is disposed "on" or "in" a computer readable medium. Additionally, as used herein, the term "database" does not necessarily imply any unity of structure. For example, two or more separate databases, when considered together, still constitute a "database" as that term is used herein.

Initial Query

The initial query presented to the system in step 912 may be created and evaluated using a variety of standard techniques. For example, the query may be presented as a set of keywords entered via a keyboard or via speech; the query may be a natural language phrase, or sentence entered via a keyboard or via speech; or the query may be an audio signal, an image, a video, or a piece of text representing a prototype for which similar audio signals, images, videos, or text may be sought. A variety of means are known by which such an initial query may be efficiently evaluated, e.g., searching a relational database, or using an inverted index.

The initial query may also be designed to simply return a random set of results.

The initial query may also be empty, i.e., impose no constraints.

Other interfaces for initial queries allow for faceted search. Faceted search provides a means for users to constrain a search along a set of axes. For example, the faceted search might provide a slider that allows users to constrain the range of acceptable prices.

Identifying Candidate Results

The search constraints created from an initial query and subsequent user input are used to identify a set of candidate results. This may be achieved using a variety of means. For example, the initial query may be performed against a relational database whereby the results are then embedded in a vector or metric space. These results may then be indexed using, e.g., a kd-tree or a metric tree and searched to identify candidates that satisfy both the initial query and the constraints. Alternatively, the initial query may also be converted to geometric constraints that are applied to the set of embedded documents. In this case the geometric representation of the constraints implied both by the initial query and the user input are combined and an appropriate index is used to identify embedded documents satisfying both sets of constraints.

As used herein, a "geometric constraint" on an embedding space is a constraint that is described formulaically in the embedding space, rather than only by cataloguing individual documents or document features to include or exclude. Preferably the geometric constraint is defined based on distance (or similarity) to at least two documents that the user has seen. For example, such a constraint might be expressed as, "all documents which are more similar to document A than to document B".

In a vector embedding space, for example, the constraint can be described in the form of a specified function which defines a hypersurface. Documents on one side of the hypersurface satisfy the constraint whereas documents on the other side do not. A hyperplane may be defined in terms of dot products or kernels and requires that $k(x,z)>0$ for a fixed vector x and a candidate z. Likewise a conic constraint may require that $k(x,z)>c$ for some constant c. In a metric embedding space, the constraint can be described in the form of a function of, for example, distances between documents. Thus in a metric embedding space, a geometric constraint might take the form of 'all documents within a specified distance from document X', for example, or 'all documents whose distance to document A is less than its distance to document B'. In one embodiment, a hyperplane defined for a metric space takes the form of an "m-hyperplane", which as used herein is defined by two points a and b in the metric space as follows:

An m-hyperplane specified by the points a and b partitions a metric space (X,d) into two sets A and B where:

$$A = \{x : x \text{ in } X \text{ such that } d(a,x) <= e^*d(a,b)^*d(b,x) + f^*d(b,x) + h^*d(a,b) + i\}$$

$$B = X \backslash A$$

Where e, f, g, h, and i are real valued constants which are not all equal to zero.

The geometric constraint is considered satisfied for only those documents which are located in a specified one of the partitions A or B of the metric space.

Geometric constraints also may be combined using set operations, e.g., union, intersection to define more complex geometric constraints. They also may be created by taking transformations of any of the example constraints discussed. For example, one may take a polynomial function of distances, e.g., $d(x,z)*d(x,z)+d(y,z)<d(w,z)$ for given documents x, y, and w, and only those documents z which satisfy the function are considered to satisfy the geometric constraint.

Note that kernels may be used independently of distances and constraints may be expressed directly in terms of kernels, polynomials of kernels, transformations of kernels, or combinations of kernels.

In an embodiment, each iteration of a user search sequence identifies a new constraint, and the result set at that iteration is defined by the combined effect of all the constraints. For example if a constraint is represented as a hypersurface, where only those candidates on side A of the hypersurface are considered to satisfy the constraint, then the result set at a given iteration might be considered to be all those candidate documents which are within the intersection of the Sides A of all the constraint hypersurfaces.

In various embodiments, constraints (either as indicated by the user or as converted to geometric constraints) may be "hard" or "soft". Hard constraints are those which must be satisfied in the sense that solutions must satisfy the conditions of all hard constraints. Soft constraints are those which need not be satisfied but candidate solutions may be penalized for each soft constraint that they don't satisfy. Solutions may be rejected in a particular embodiment if the accumulation of such penalties is too large. Constraints may be relaxed in some embodiments, for example hard constraints may be converted to soft constraints by associating them with a penalty, and soft constraints may have their penalties reduced.

One way in which geometric constraints may be represented is to maintain a list of all unordered pairs of documents. Each entry in the list would be a pair (a,b), where a represents one document and b represents another document. (Note that the pair (b,a) may also appear in the list). Each entry is understood to mean that a candidate must be closer to the first element than to the second element in the pair. Thus the two elements of the pair are sometimes referred to herein as "anchor documents". For example, given document c the pair (a,b) would be associated with the constraint $d(a,c)<d(b,c)$. A real number can be associated with each pair. In the hard constraint case that number could be 0 or 1 with a 1 meaning that constraint must be satisfied and a 0 meaning that it does not need to be satisfied. Alternatively, in the soft constraint case the number could be any real number representing the penalty associated with breaking that constraint. This information could be maintained in other ways, e.g., using sparse representations. One alternative would be to maintain only those pairs associated with non-zero real numbers.

The goal of each set of geometric constraints derived in step 918 from the user's relative feedback is to further narrow or modify the prior candidate space so as to form a new candidate space which better approaches the user's desired target. At each iteration, the information that the system has about the user's desired target is provided in the form of the user's relative feedback, which is provided in the form of a selection of documents. In general, therefore, each i'th set of geometric constraints identifies an i'th candidate space such that, according to some predefined definition of collective closeness, the documents in the i'th candidate space are collectively closer in the embedding space to the documents in the i'th selected subset, than are the documents in the (i−1)'th candidate space. This means that the predefined definition of collective closeness is defined such that, at a minimum, a candidate document X is considered closer to a document A than to a document B if in the embedding space, $d(A,X)<d(B,X)$.

For one embodiment in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the fraction of the documents in the given candidate space which are closer in the embedding space to the farthest document in the given selected subset than to the nearest document in the given non-selected subset, is greater than the fraction of the documents in the particular prior candidate space which are closer in the embedding space to the farthest document in the given selected subset than to the nearest document in the given non-selected subset.

For another embodiment in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the count, over all documents Y in the given candidate space and all pairs of documents (A,B), A in the i'th selected subset and B in the i'th non-selected subset, of instances in which $d(A,Y)<d(B,Y)$, is less than the count, over all documents X in the particular prior candidate space and all the pairs of documents (A,B), of instances in which $d(A,X)<d(B,X)$, each of the counts normalized for any difference between the total number of documents Y in the given candidate space and the total number of documents X in the particular prior candidate space.

For yet another embodiment in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if the fraction of the documents Y in the given candidate space which are closer to the documents A in the i'th selected subset, averaged over all the documents A in the i'th selected subset, than they are to the documents B in the i'th non-selected subset, averaged over all the documents B in the i'th non-selected subset, is less than the fraction of the documents X in the particular prior candidate space which are closer to the documents A in the i'th selected subset, averaged over all the documents A in the i'th selected subset, than they are to the documents B in the i'th non-selected subset, averaged over all the documents B in the i'th non-selected subset. The term "an average", as used herein, includes both a mean and a median, and optionally includes weighting as well.

For still another embodiment in which the i'th selected subset or the i'th non-selected subset or both can contain more than one document, the predefined definition of collective closeness is defined further such that the documents in a given candidate space are collectively closer to the documents in a given selected subset, than are the documents in a particular prior candidate space, if an aggregation, over all documents Y in the given candidate space and all pairs of documents (A,B), A in the i'th selected subset and B in the i'th non-selected subset, of penalties associated with each instance in which $d(A,Y) \geq d(B,Y)$, is less than an aggregation, over all documents X in the particular prior candidate space and all the pairs of documents (A,B), of penalties associated with each instance in which d(A,X)≥d (B,X), where each instance in which d(A,W)≥d(B,W) is satisfied, for a given document W, is pre-associated with a respective penalty value. "Aggregation", or "aggregate", as used herein, includes sum, percentage, or other normalization, in which the further inclusion of an additional positive number does not decrease the total aggregate.

An advantage of working with geometric constraints is that, in an embodiment, the memory and computational resources required to maintain and update the constraints depends on the number of constraints and not on the catalog size. This would, for example, allow constraint management to be performed and maintained on a mobile device such as a phone or tablet,rather than on a server.

Discriminative Result Set

Search queries may be ambiguous, or underspecified and so the documents satisfying a query may be quite diverse. For example, if the initial query is for a "red dress" the results may be quite varied in terms of their length, neckline, sleeves, etc. This aspect of the module sub-selects a discriminating set of results. Intuitively the objective is to provide a set of results to the user such that selection or de-selection of those results provides the most informative feedback or constraints to the search algorithm. One may think of this step as identifying an "informative" set of results, or a "diverse" set of results, or a "discriminating" set of results. Discriminative selection module 828, performing step 918, selects a discriminative subset of results in any of a variety of ways.

In one embodiment, a subset of the results may be discriminative as it provides a diversity of different kinds of feedback that the user can select. Diverse images may be selected as in, e.g., van Leuken, et al., "Visual Diversification of Image Search Results," in WWW '09 Proceedings of the 18th international conference on World wide web, pp. 341-350 (2009), incorporated by reference herein. This diverse set is selected in order to provide the user with a variety of ways in which to refine the query at the next iteration. There are a variety of ways in which such a set may be identified. For example, farthest first traversal may be performed which incrementally identifies the "most" diverse set of results. Farthest first traversal requires only a distance measure and does not require an embedding. Farthest first traversal may also be initialized with a set of results; subsequent results are then the most different from that initial set.

Other means for selecting discriminative subsets of candidate results include using an algorithm like PCA (principal component analysis) or kernel PCA to identify the key axes of variation in the complete set of results. The discriminative subset is then constructed to contain documents that lie at multiple points along those most discriminating axes.

Another means for selecting discriminative subsets of candidate results might use a clustering algorithm to select discriminative subsets of candidate results. Such a mechanism may use a clustering algorithm such as k-means, or k-medoids to identify clusters of similar documents within the candidate results. See http://en.wikipedia.org/wiki/K-means_clustering (visited 29 Apr. 2015) and http://en.wikipedia.org/wiki/K-medoids (visited 29 Apr. 2015), both incorporated by reference herein. One or more representative documents would then be selected from each cluster to yield the discriminative subset. In particular, when k-medoids is used the medoid of each cluster may be used as one of the representatives for that cluster.

Still another means might consider the set of constraints that would result from the user selecting or deselecting a given document. This set of constraints may be considered in terms of the candidate results it would yield. A discriminative subset may be selected so that the sets of candidate results produced by selecting any of the documents in that discriminative subset are as different as possible.

As used herein, "discriminativeness" of a particular set of documents in a group of documents is the least number of documents in the group that are excluded as a result of user selection of any document in the set. That is, if user selection of different documents in the particular set results in excluding different numbers of documents in the group, then the set's "discriminate veness" is considered herein to be the least of those numbers. Note that either the discriminative set of documents, or the formula by which user selection of a document determines which documents are to be excluded, or both, should be chosen such that the union of the set of documents excluded by selecting any of the documents in a discriminative set equals the entire group of documents.

Also as used herein, the "average discriminativeness" of a set of size n documents in a group of documents, is the average, over all sets of size n documents in the group of documents, of the discriminativeness of that set. Also as used herein, one particular set of documents can be "more discriminative" than another set of documents if the discriminativeness of the first set is greater than the discriminativeness of the second set.

Preferably the selection module 828, performing step 918, selects a set of N1>1 documents from the current candidate space 826, which is more discriminative than the average discriminativeness of sets of size N1 documents in the candidate space. Even more preferably, selection module 828 performing step 918 selects a set which is at least as discriminative as 90% of, or in some embodiments all of, other sets of size N1 documents in the current candidate space.

Also note that not all embodiments necessarily need to perform step 918 of selecting a discriminative subset of candidates. In some embodiments it is sufficient for the user interaction module 822 to present toward the user a subset of documents that are chosen randomly from the candidate set, or that are chosen in some other way. In such an embodiment the discriminative selection module 828 is replaced with simply a selection module.

The selected subset may be chosen to balance discriminativeness with satisfying soft constraints. For example, if soft constraints are used then each document becomes associated with a penalty for each constraint it breaks. The selected subset may be chosen to trade-off the total penalties for all candidates in the selected subset, with the discriminativeness of that subset. In particular, the document with the smallest penalty may be preferentially included in the selected subset even if it reduces the discriminativeness.

In some cases, see below, constraints may be managed and updated using a machine learning algorithm. In particular, this may include active learning algorithms, or bandit algorithms. These algorithms identify "informative" (or discriminative) examples at each iteration. When these algorithms are used to manage constraints, their identification of informative examples may be used as the discriminative subset, or as the basis for determining the discriminative subset. Bandit algorithms are of particular interest as they seek to trade-off maximizing reward (i.e., finding the target document), with identifying discriminative examples.

Any of the above techniques for selecting a discriminative subset may also be used in the selection of an initial collection of candidate documents to be presented toward the user, either before or after an initial query.

Result Presentation

The aim of the discriminative results presentation to the user in step 920 by user interaction module 822, is to provide the user with a framework in which to refine the query constraints.

For example the results may be presented as a two dimensional grid. Results should be placed on that grid in a way that allows the user to appreciate the underlying distances between those results (as defined using a distance measure or embedding). One way to do this would be to ensure that results that are far from each other with respect to the distance measure are also displayed far from each other on the grid. Another way would be to project the embedding space onto two dimensions for example using multidimensional scaling (MDS) (for example see: Jing Yang, et al., "Semantic Image Browser: Bridging Information Visualization with Automated Intelligent Image Analysis," Proc. IEEE Symposium on Visual Analytics Science and Technology (2006), incorporated herein by reference). Yet another way would be to sub-select axes in the embedding space and position results along those axes.

Other layouts contemplated include 2 dimensional organizations not on a grid (possibly including overlapping results), 3 dimensional organizations analogous to the 2 dimensional organizations. Multi-dimensional organizations analogous to the 2 and 3 dimensional organizations with the ability to rotate around one or more axes. In general an M-dimensional layout can be used, where M>1. In embodiments in which the embedding space has dimensions, the number of dimensions in the presentation layout need not be the same as the number of dimensions in the embedding space. Yet other layouts include hierarchical organizations or graph based layouts.

The document placement in the layout space should be indicative of the relationship among the documents in embedding space. For example, the distance between documents in layout space should correspond (monotonically, if not linearly) with the distance between the same documents in embedding space. Also, if three documents are collinear in embedding space, advantageously they are placed collinearly in layout space as well. In particular, collinearity in layout space with a candidate document which the system identifies as the most likely target of the user's query (referred to herein as the primary candidate document) indicates collinearity in the embedding space with the primary candidate document.

It will be appreciated, however, that embedding space typically has a very large number of dimensions, and in high dimensional spaces very few points are actually collinear. In an embodiment, therefore, documents presented collinearly in layout space indicate only "substantial" collinearity in embedding space. As used herein, if the embedding space is such that each document has a position in the space (as for a vector space), then three documents are considered "substantially collinear" in embedding space if the largest angle of the triangle formed by the three documents in embedding space is greater than 160 degrees. If the embedding space is such that documents do not have a position in the embedding space, but they do have distances from each other (such as for a metric space), then as used herein, a group of three documents are considered collinear if the sum of the two smallest distances between pairs of the documents in the group in embedding space equals the largest distance between pairs of the documents in the group in embedding space. The three documents are considered "substantially collinear" if the sum of the two smallest distances exceeds the largest distance by no more than 10%. As used herein, "collinearity" and "substantial collinearity" do not include the trivial cases of coincidence or substantial coincidence.

User Input

User interaction module 822 provides the user with a user interface (UI) which allows the user to provide input in a variety of ways. For example, the user may click on a single result to select it, or may swipe in the direction of a single result to de-select it. Similarly, the user may select or deselect multiple results at a time. For example, this may be done using a toggle selector on each result. The user might also implicitly select a set of results by swiping in the direction of a result indicating a desire for results that are more like that result "in that direction". In this case "in that direction" means that the differences between the primary result and the result being swiped should be magnified. That is, the next set of results should be more like the result being swiped and less like the "primary result". This concept may be generalized by allowing the user to swipe "from" one result "to" another result. In this case new results should be more like the "to" result and less like the "from" result.

Additionally, the UI can provide the user with the ability (e.g., via a double-click, or a pinch) to specify that the next set of results should be more like a specific result than any of the other results displayed. That is, the user selects one of the displayed results to indicate that that result is preferred over all other displayed results. This may then be encoded as a set of constraints indicating for each non-selected document that future candidates should be closer (in embedding space) to the selected document than to that non-selected document. This form of feedback, in which the user selects documents to indicate they are "more relevant" than the non-selected documents to the user's desired goal, is sometimes referred to herein as "relative feedback". It is distinct from more traditional "categorical feedback", in which users are required to select candidates that are and are not relevant. However, in many cases relevant documents are so rare that there may be no such documents available for the user to select. Conversely, embodiments of the system herein allow relative feedback where the user identifies more relevant candidates that may not actually be strictly relevant to the target, but still provide significant information to guide further searching. Relative feedback and categorical feedback both can be considered forms of "relevance feedback".

One way to encode relative feedback is as a set of geometric constraints on the embedding space. For each non-selected image B a constraint is created of the form $d(A,C)<d(B,C)$ where A is the selected image and C is the candidate image to which the constraint is applied (d is the distance in the embedding space). A candidate C then satisfies the constraint only if it satisfies $d(A,C)<d(B,C)$. In this way a single click generates multiple constraints. These constraints may be combined, e.g., such that the combined constraint is their intersection, and further candidate documents can be given a rank which is a monotonic function of the number of individual ones of the constraints that the candidate breaks (with smaller rank indicating greater similarity to the user's target). Alternatively, the constraints may be used as soft constraints by associating each such constraint with a penalty. In this alternative further candidate documents can be given a rank which is a monotonic function of the sum total of the penalties associated with all of the individual constraints that the candidate breaks. In still further embodiments the rank may be made dependent upon the age of a constraint (how early in the iterative search the constraint was imposed). This may be accomplished in one embodiment by determining (or modifying) a penalty associated with each given constraint in dependence upon the iteration number in which the given constraint was first imposed. In one embodiment the penalty may be designed to increase with the age of the constraint, whereas in another embodiment the penalty may be designed to decrease with the age of the constraint.

This approach may be extended to allow the user to select multiple images that are more relevant. This feedback may be interpreted such that each of the selected images are more relevant than each of the not selected images. In an embodiment, the system might then create a different constraint corresponding to each pair of one selected document and one non-selected document. A total of P*Q constraints are created, where P is the number of selected documents and Q is the number of non-selected documents. The constraints may be of the form $d(A_i,C) < d(B_j,C)$, $i=1 \ldots P$ and $j=1 \ldots Q$.

The UI could provide the inverse ability, i.e., it may allow the user to select less relevant rather than more relevant images and the above description would be modified appropriately.

The UI can also provide the ability to specify that the next set of results should be like a particular selection but more diverse than the currently selected set of results.

Furthermore, the UI can provide the user with the ability to remove previously added constraints. In one embodiment, a stack (or history) of constraints is maintained. The UI provides the user with the ability to pop constraints off of the stack and hence remove constraints that were previously added. Even more particularly, when each piece of user feedback is provided as a single preferred image, i.e., the selected image is preferred over the non-selected images the UI may display the sequence of selected images and allow the user to remove a single (previously selected image) and its associated constraints, or may allow the user to go back to a previous state by sequentially popping images (and their associated constraints) off of the stack. This may be achieved with a "back button", or by displaying the stack on the user interface.

The UI may also provide the ability for the user to specify that a different set of similarly diverse images be provided.

The UI may also provide the ability for the user to provide multiple different kinds of feedback.

Refined Query

The system then incorporates the user's input to create a refined query. The refined query includes information regarding the initial query and information derived from the iterative sequence of refinements made by the user so far. This refined query may be represented as a set of geometric constraints that focus subsequent results within a region of the embedding space. Likewise, it may be represented as a set of distance constraints whose intersection defines the refined candidate set of results. It may also be represented as a path through the set of all possible results.

For example, the refined query may include constraints that require subsequent results to be within a specified distance of one of the selected candidate results. Or the refined query may include constraints that require subsequent results to be closer (with respect to the distance measure) to one candidate result than to another. These constraints are combined with the previously identified constraints in a variety of ways. For example, candidates may be required to satisfy all of these constraints, or may be required to satisfy a certain number of all constraints, or, in the case of soft constraints, they may be charged a penalty for each constraint they break.

Another way to manage constraints and refine the query is to use a machine learning algorithm, see below.

Users may specify incompatible constraints. A system according to the invention may have the ability to relax, tighten, remove, or modify constraints that it determines are inappropriate.

One way in which constraints may be relaxed or removed is with user feedback. In particular, the UI may provide a means for the user to remove previously added constraints, or to pop constraints off of a history, i.e., to "go back".

Another way in which the system might relax or tighten constraints is in the context of soft constraints. In particular, if the geometric constraints are treated as soft constraints, i.e., a penalty is charged for each broken constraint, then these penalties may be different for each constraint. Specifically, older constraints may have smaller or larger penalties than newer constraints. Here newer constraints are those which were added in recent iterations, while older constraints are those which were added in earlier iterations. Wherever soft constraints are implemented with penalties, the candidate results may then be documents that have smaller total penalties summed over all such constraints. The candidate result set is then all documents whose total penalty is less than some predetermined value, or only the N documents having the smallest total penalty, where N is a predefined integer.

Machine Learning for Refining Queries

The geometric constraints may be updated and maintained using a machine learning algorithm. In such embodiments, the user's feedback is treated as training data to which the machine learning algorithm is applied, and the result of that application yields a model (also sometimes referred to herein as a hypothesis) of the user's desired target, that may in some cases be a geometric constraint. However, the resulting constraint is typically not expressed directly in terms of the user's feedback. That is, the resulting model does explicitly test for the distances between candidate documents and documents for which the user has provided feedback, rather this relationship is indirect or implicit.

While many machine learning algorithms learn to classify documents into two or more classes, e.g., relevant or not relevant, some algorithms rank order documents according to their relevance. Examples of such algorithms include RankBoost (Freund, et al., "An Efficient Boosting Algorithm for Combining Preferences," Journal of Machine Learning Research 4 (2003) 37 pages), or the Ranking Perceptron (Collins, et al., "Convolution Kernels for Natural Language," in Advances in Neural Information Processing Systems, pp. 625-632 (2001)), both incorporated by reference herein. Such algorithms use feedback or training examples where only ordering information is provided. Specifically, they make use of training data where documents (examples) are not classified as relevant or irrelevant, but rather are rank ordered with respect to their relative relevance.

When viewed in the context of FIG. 9, rank order learning algorithms sometimes refer to the geometric constraints developed in step 914 as a "hypothesis" or "model". Thus in the case of rank order learning algorithms, the development of geometric constraints in step 914 involves training or updating the current hypothesis or model based on the user feedback combined with the feedback from previous iterations. The subset of candidates presented toward the user in step 920 typically would be some limited number of the highest ranking documents based on the current hypothesis. This would not necessarily be a "discriminative" subset. However, some learning algorithms also naturally identify informative or discriminative documents as part of their process of hypothesis development. These are typically documents that when labeled as relevant or irrelevant and added to the training set will most improve the model. For these kinds of learning algorithms, the step 918 to select a discriminative subset merely involves selecting the documents already identified naturally in step 916, and the subset of candidates presented toward the user in step 920 is indeed discriminative.

One approach to the use of machine learning algorithms to update and maintain geometric constraints is to use a classification algorithms such as Support Vector Machines (e.g. Tong, et al., "Support Vector Machine Active Learning for Image Retrieval," In Proceedings of the ACM International Conference on Multimedia, 12 pages, ACM Press, 2001, incorporated by reference herein; or Tieu et al., "Boosting Image Retrieval," International Journal of Computer Vision 56(1/2), pp. 17-36, 2004, Accepted Jul. 16, 2003, incorporated by reference herein). Support Vector Machines maintain a single hyperplane in the embedding space. Variants of Support Vector Machines may use active learning not only to identify new constraints at each iteration, but also to select an informative set of candidate documents at each iteration.

Alternatively we may use an so-called "online learning algorithm" (http://en.wikipedia.org/wiki/Online_machine_learning, visited 29 Apr. 2015) or a so-called "multi-armed bandit" learning algorithm (http://en.wikipedia.org/wiki/Multi-armed_bandit, visited 29 Apr. 2015), either of which can be used to accomplish the same result. Both these documents are incorporated by reference herein.

Online learning algorithms, as the term is used herein, maintain a model or hypothesis that is incrementally updated based on training data. That is, these algorithms do not require access to the complete set of training data, or in the present context the complete set of user feedback. When new training data is presented, these algorithms can update their model or hypothesis without having to re-train the system with previously seen training data. Rather these algorithms maintain a model or hypothesis that is updated incrementally based only on the most recent set of feedback. Because of this they can require substantially less memory and/or computational resources, allowing them, for example, to be performed on a mobile device. In the context of the present description the hypothesis may be used to represent the geometric constraints. For example, it may represent a hyperplane in the embedding space, or it may represented a weighted combination of items in a catalog where items with larger weight are understood to be closer to the target item. Users' feedback is interpreted as the training data that the online learning algorithm uses to learn from. That is, the online learning algorithm updates its hypothesis (geometric constraints) based on this feedback. In one embodiment, the online learning algorithm uses the "Prediction with Expert Advice" framework (Cesa-Bianchi et al., Prediction, Learning, and Games, Cambridge University Press, 2006, incorporated by reference herein). In this case each catalog item (document) is interpreted as an expert and assigned a weight. Initially, these weights are all the same. Each catalog item when combined with the associated distance can be understood to provide an ordering of the catalog. Specifically, for a catalog item A, all other items in the catalog, X for example, may be assigned a number corresponding their distance, e.g., d(A,X). The items in the catalog may then be sorted using that number, i.e., d(A,X). For a set of candidates each expert corresponding to a catalog item, e.g., A, recommends the selection of the item, e.g., X, it ranks highest in that set, i.e., the item for which d(A,X) is smallest. The weight of each expert is then increased or decreased depending on whether the user selected that expert's highest ranked item. Proceeding iteratively the item the user is searching for will be correct (i.e., recommend the correct item from the candidate set) more often than any other item and so will obtain the largest weight. Many variations on this general approach are possible. Generally online learning algorithms do not also provide a natural means to yield a discriminative subset. However, they may be combined with a variety of other means to do so including means based on PCA, clustering, or any other means by which a highly discriminative subset can be chosen including brute force search methods.

Multi-armed bandit algorithms are closely related to the "Prediction with Expert Advice" framework. Similarly to online learning algorithms these algorithms maintain a hypothesis that is incrementally updated based on user feedback. Rather than maintain the complete set of user feedback they update their hypothesis based only on the most recent feedback. Again, this means that these algorithms may require fewer computational resources and may therefore be performed on a mobile device. This would allow the constraints to be managed on the mobile device rather than on a separate server. These algorithms likewise maintain a set of experts (referred to as "arms") and seek to identify a good one. The key distinction (in the present setting) is that at each round these algorithms select one or more "arms" (or experts) to play. In the present context "play" means present to the user. Arms are selected so as to balance two goals: play good arms, and learn which arms are good. The user feedback is then interpreted as reward to the selected arms, e.g., if the user clicks on one of the arms that may translate to high reward. One way such an algorithm may be adapted to maintain and update the geometric constraints, and to select a subset of candidates is described below. Clearly, other adaptations may also be effective. Again each item (document) in the catalog is associated with an arm (expert). Each arm is associated with an estimate of its reward (i.e., its suitability as the solution to the query) and a confidence interval (certainty value) for that estimate. Initially, all of the reward estimates are equal and all of the certainties are identical. At each iteration of the search procedure one or more arms are selected as the "discriminative set" and presented to the user. The user clicks on one of the candidates and the corresponding arm is provided with high reward. The other candidates are provided with low reward. The corresponding reward estimates are updated. The certainty of each of the arms in the candidate set is increased as more data has been collected to estimate its reward. Now the algorithm selects another set of candidates (arms) such that the set contains arms with either high reward or large uncertainty about their reward or both. Proceeding iteratively, the target of the user's search will obtain a highly certain estimate of high reward and be identified as the best arm.

Identifying Next Results

Given a distance (dissimilarity measure) between documents to be searched, or an embedding of those documents into a vector space or onto a manifold there are a variety of data structures that may be used to index that document catalog and hence allow for rapid search. Such data structures include metric trees, kd-trees, R-trees, universal B-trees, X-trees, ball trees, locality sensitive hashes, and inverted indexes.

The system uses a combination of such data structures to identify the next set of candidate results based on the refined query.

An advantage of using geometric constraints is that they may be used with such efficient data structures to identify next results in time that is sub-linear in the size of the catalog.

Learning Distances

User behavior data may be collected by a system according to the invention and used to improve or to specialize the search experience. In particular, many ways of expressing distances or similarities may be parameterized and those parameters may be fit. For example, a similarity defined using a linear combination of kernels may have the coefficients of that linear combination tuned based on user behavior data. In this way the system may adapt to individual (or community, or contextual) notions of similarity.

Similarly, such kernels or distances may be learned independently of the search method. That is they may be learned on data collected in different ways. This data may, or may not, be combined with data captured during the search process.

Of particular interest is the use of deep learning, e.g., neural networks with more than 3 layers, to learn distances or similarity.

Figure 19:
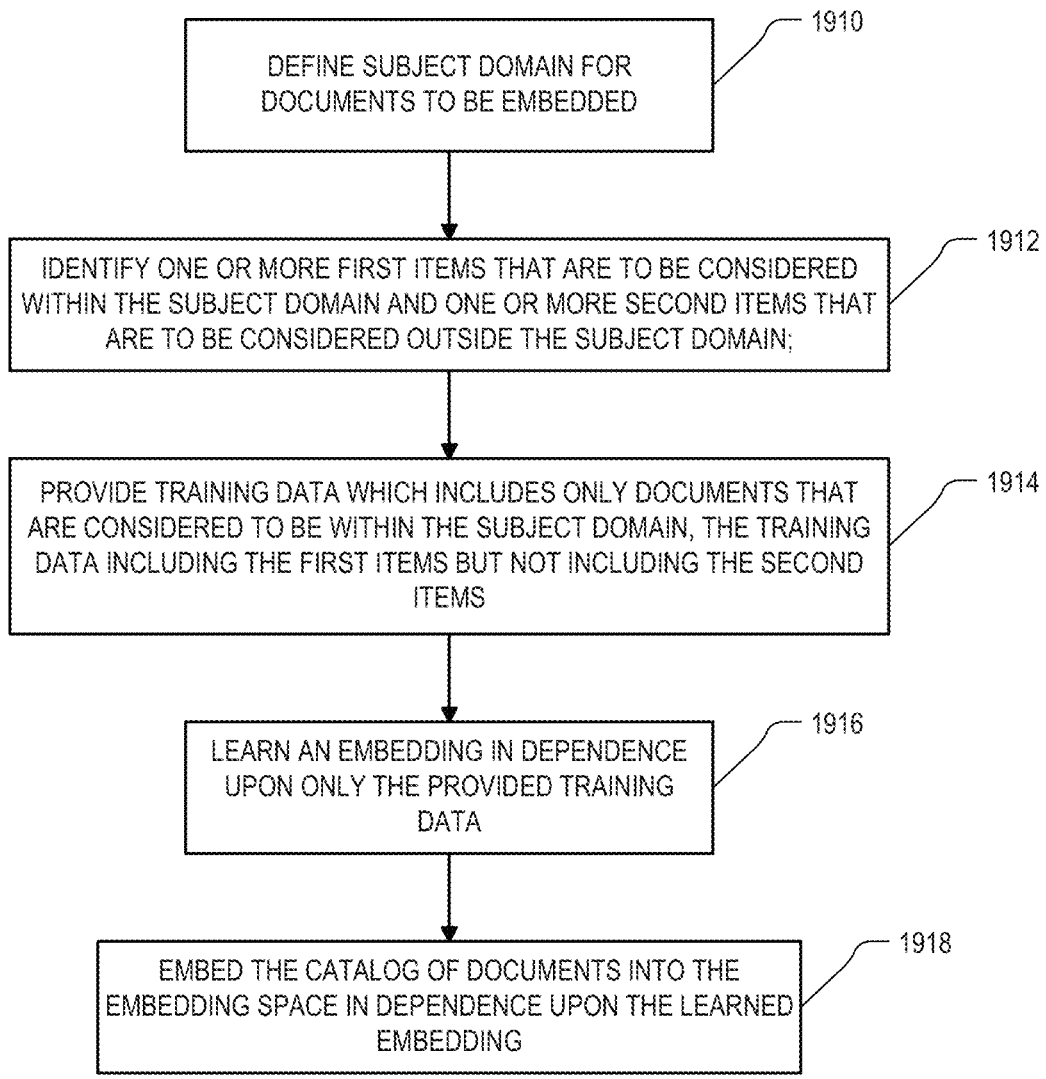
FIG. 19 illustrates pertinent parts of an embodiment in which an embedding is learned for a subject domain.

In some embodiments, distances are learned specifically for specific applications. For example, For example, an embodiment uses the method to search for potential partners (e.g., on a dating site) may learn a kernel that captures facial similarity. It may also learn a kernel that captures similarity of interests based on people's Facebook profiles. These kernels (or distances) are learned specifically to address the associated search problem and may have no utility outside of that problem. FIG. 19 illustrates pertinent parts of an embodiment in which distances are learned specifically for a subject domain.

Referring to FIG. 19, in step 1910 the subject domain is defined. Examples of subject domains include clothing, jewelry, furniture, shoes, accessories, vacation rentals, real estate, cars, artworks, photographs, posters, prints, home décor, physical products in general, digital products, services, travel packages, or any of a myriad of other item categories. In step 1912 one or more items that are to be considered within the subject domain are identified, and one or more items that are to be considered outside the subject domain are identified. In step 1914, a training database is provided which includes only documents that are considered to be within the subject domain. This training database includes the first items but not the second items. In step 1916 an embedding is learned in dependence upon only the provided training data, i.e. not based on any documents that are considered to be outside the subject domain. A machine learning algorithm can be used to learn this embedding. In step 1918, the catalog of documents is embedded into the embedding space using the learned embedding. Preferably the catalog of documents embedded into the embedding space is itself limited to documents within the subject domain. Processing later can continue with step 912 or 914 of FIG. 9 or its variants as described herein.

Some Illustrations

Figure 3:
FIGS. 3-7 and 10A illustrate documents embedded in 2-dimensional embedding space.

FIG. 3 illustrates a set of documents embedded in 2-dimensional space. Aspects of the invention envision embedding documents in spaces of large dimensionality, hence two dimensions is for illustration purposes only. The space 310 contains documents, e.g., 321, 322. Each pair of documents has a distance 330 between them.

Figure 4:
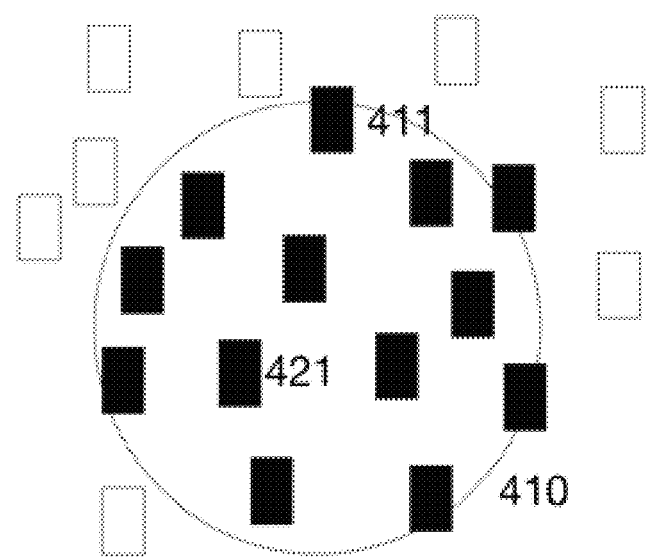

FIG. 4 illustrates the set of documents from FIG. 3 in addition to a circular geometric constraint 410. Those documents inside the circle, e.g., 421, 422 are said to satisfy the constraint. Aspects of the invention express queries and user input in the form of such geometric constraints. The documents that satisfy the constraints are the current results of the query. As the user provides further input additional constraints may be added, or existing constraints may be added or removed.

Figure 5:
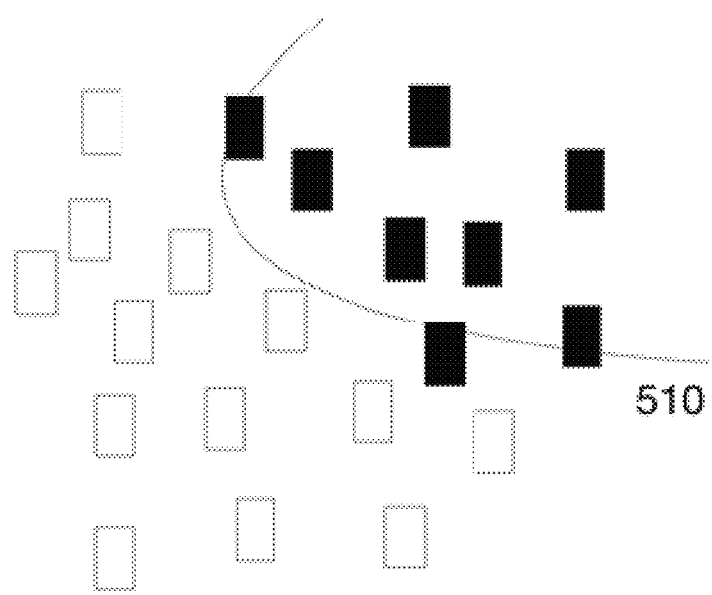

FIG. 5 illustrates the set of documents from FIG. 3 in addition to a non-circular geometric constraint 510. Aspects of the invention envision geometric constraints of arbitrary shape, and unions, intersections and differences of such constraints.

Figure 6:
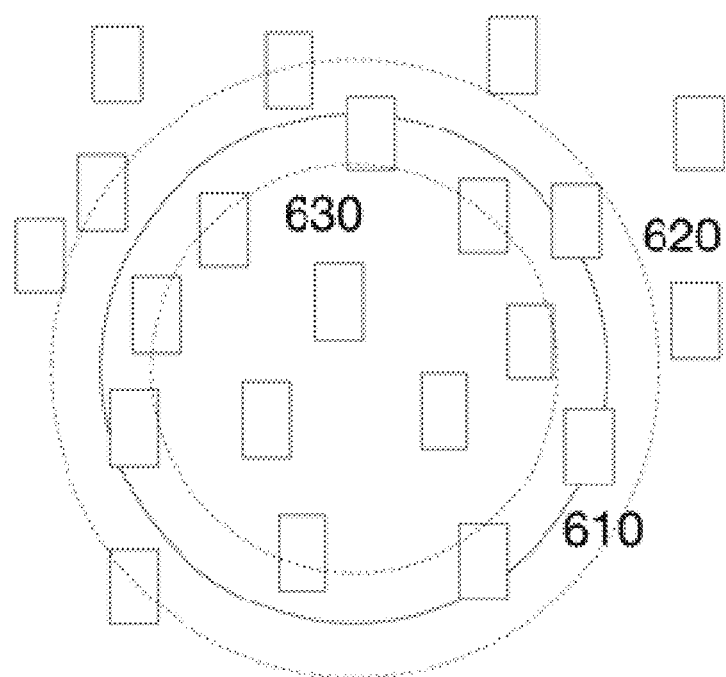

FIG. 6 illustrates a means by which the circular constraint of FIG. 4 may be updated in response to user input. The original circular constraint 610 may be modified by increasing its radius to produce circular constraint 620, or by decreasing its radius to produce constraint 630. These modifications are done in response to user input. The set of documents satisfying these constraints will change as the constraints are modified thus reducing or expanding the set of images considered for display to the user.

Figure 7:
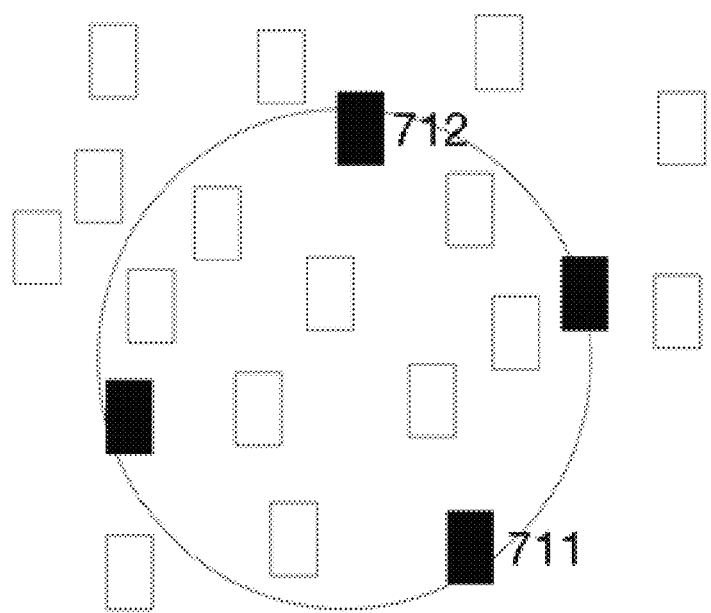

FIG. 7 illustrates a means by which a discriminative subset of documents may be selected for presentation to the user. The documents highlighted, e.g., 711, 712, are distinct from each other and from the others contained in the circular constraint region.

Figure 10A:
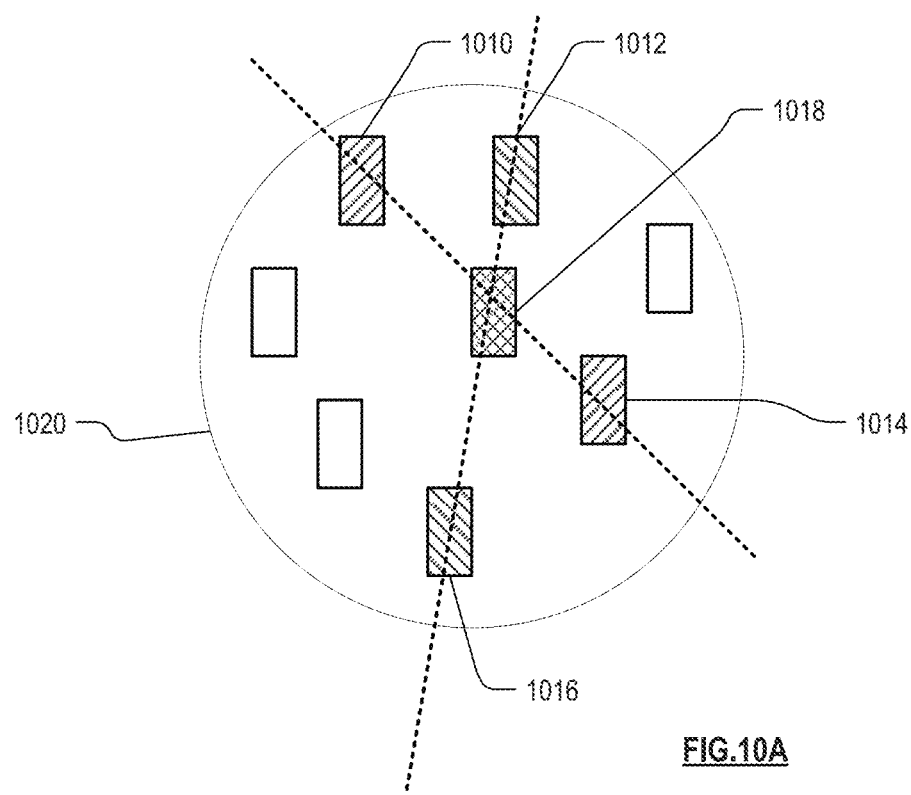

FIG. 10A illustrates a set of documents in embedding space, in which query processing module 824 has narrowed the collection to those documents within the circle 1020, and has identified primary result document 1018. In addition, discriminative selection module 828 has selected documents 1010, 1012, 1014 and 1016 as the discriminative set to present to the user. It can be seen that in embedding space, documents 1012, 1018 and 1016 are substantially collinear, and that documents 1010, 1018 and 1014 are substantially collinear.

Figure 10B:
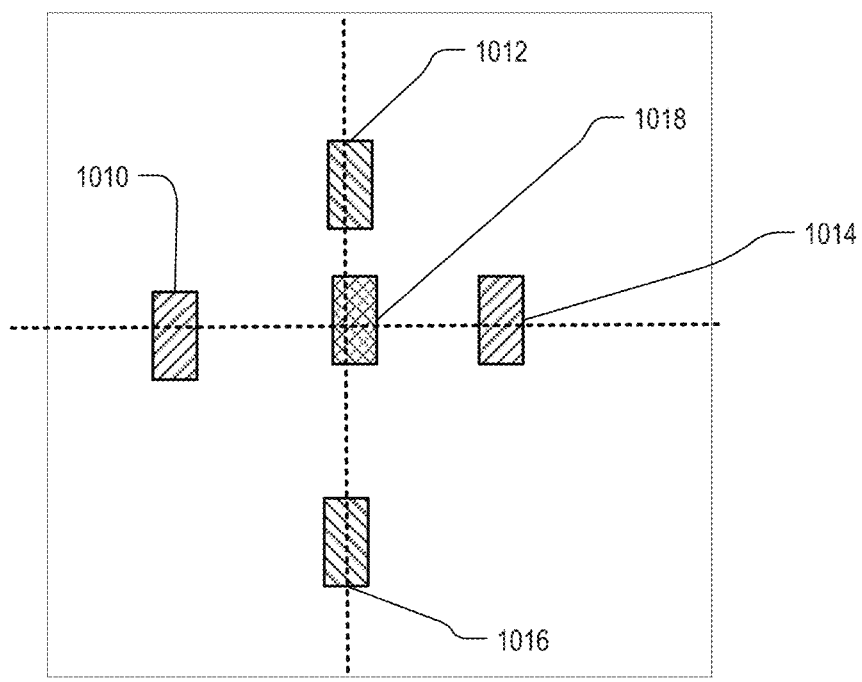
FIG. 10B illustrates certain documents from FIG. 10A in layout space.

FIG. 10B illustrates how the system may present the set of documents in layout space. (The broken lines are implied, rather than visible.) The specific positions of the documents do not necessarily match those in embedding space, in part because dimensionality of the space has been reduced. However, documents which were substantially collinear in embedding space are collinear in layout space. In particular, if the broken lines in FIG. 10A represent dimensions in embedding space along which the candidate documents differ, the placement of the documents in layout space in FIG. 10B are indicative of those same dimensions. In addition, the relative distances among the documents along each of the lines of collinearity in layout space also are indicative of the relative distances in embedding space.

Figure 11:
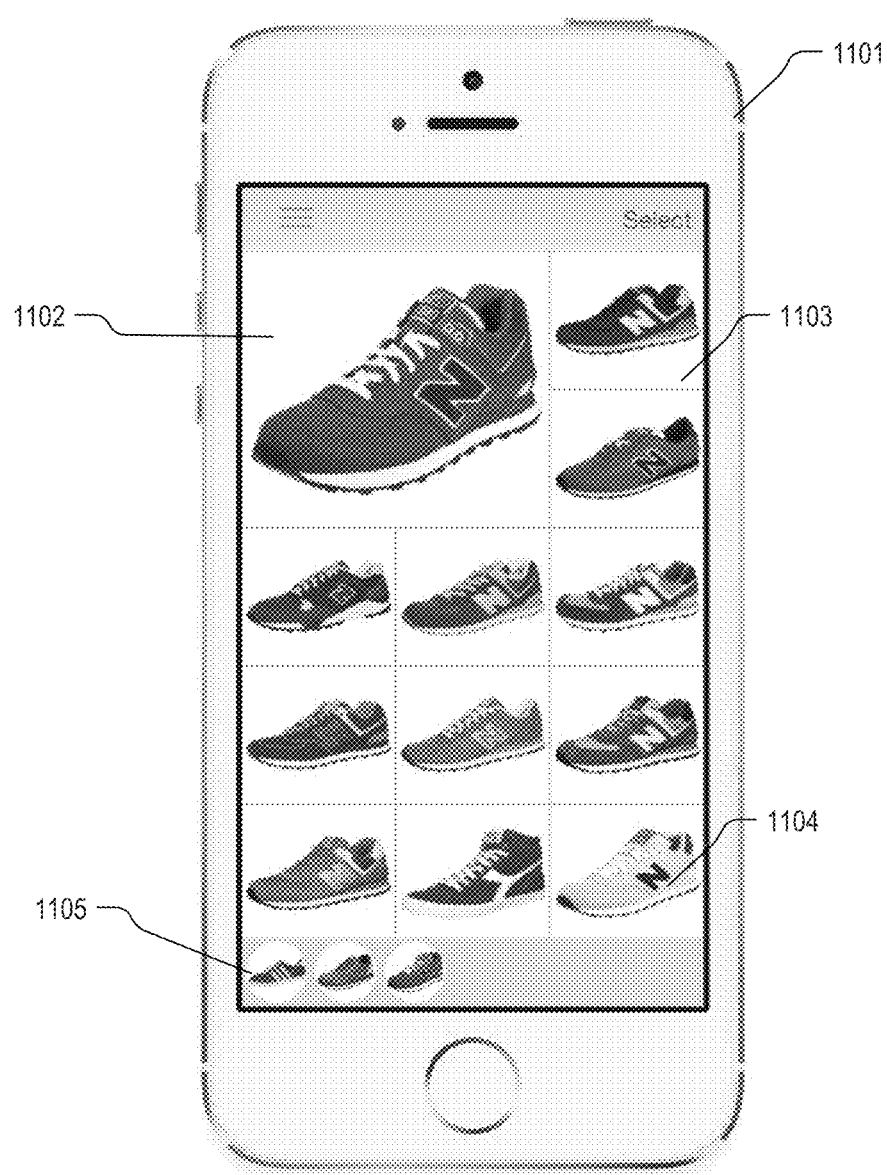
FIG. 11 illustrates one embodiment to enable searching for shoes.

FIG. 11 illustrates one embodiment to enable searching for shoes. This embodiment is on a mobile device 1101. In this embodiment the catalog is maintained and candidate results are identified on a server, while the constraints are maintained on the mobile device. The shoes are embedded in a high dimensional space by applying a neural network trained to capture the visual similarity between shoes. Other contributions are made to the embedding using kernels that compare meta-data about the shoe, e.g., its brand. The primary result is displayed prominently as a large image in the top left corner 1102. The shoe that is closest to the primary result in embedded space 1103 (i.e., is most similar) is displayed closest to the primary result. A discriminative set of results that satisfies the current constraints is then displayed. These constraints may be hard or soft constraints in different embodiments, or some may be hard constraints and others soft constraints. Note that these results retain significant diversity, e.g., the shoe that is farthest in embedding space (and displayed farthest from the primary result)

1104 is a different color, but the same brand as the primary result. This embodiment maintains a stack of constraints. Each constraint requires the candidate to be closer to a user-selected image than one non-selected image. Thus at each iteration multiple constraints, e.g., 11, may be added. In one embodiment these constraints are treated as soft constraints in that each candidate suffers a penalty for each broken constraint. The candidate results are those with smaller penalties. In this embodiment the stack of selected images is displayed at 1105 with the oldest user selection at the left and newer ones to the right. The user may click on any image in this stack. This will pop all images (and their associated constraints) to the right of the clicked image off the stack. This has the effect of taking the user back to a previous search state, defined by the set of constraints that were in effect before the clicked image was selected.

Advantages Over Prior Systems

Various embodiments of the approaches described herein may yield one or more of the following advantages over prior systems:

- An embodiment need not be limited to a single fixed hierarchy of documents. More specifically, an embodiment need not require the explicit determination of a taxonomy by which the document catalog is described. Nor does it require a clustering of documents into a static hierarchy. That is, the sequence of refinements that a user may perform need not be constrained to narrowing or broadening in some pre-defined taxonomy or hierarchy.
- An embodiment can be extremely flexible and may be applied to images, text, audio, video, and many other kinds of data.
- Intuitions about the relationships among documents are often easier to express using notions of similarity or distance between documents than using a taxonomy or tags.
- Selecting and deselecting candidate results in a visual way is a more facile interface for performing search on a mobile device or a tablet.
- Encoding query refinements in terms of geometric constraints allows for a more flexible user interaction. Specifically, in an embodiment, the user is not required to be familiar with a pre-defined tagging ontology, or with a query logic used to combine constraints. Furthermore, in an embodiment such geometric constraints can be more robust to errors in a feature tagging or annotation process.
- The ability to incrementally refine a search is helpful to a productive user experience.
- The use of a discriminative subset of candidate results makes more effective use of limited display space. The clutter on the display is minimized while simultaneously capturing a high proportion of the information available in the complete results set and providing a wide variety of options for the user to refine a query.
- Given that distances, embeddings, and similarities may be machine learned, a system using this approach can provide the ability to specialize the search experience to individuals, groups, cultures, and document categories.
- Compared to content based image retrieval (CBIR) techniques, an embodiment of the invention can be more amenable to incremental refinement of a search. Specifically, a user may take a photograph and use a CBIR system to identify related or highly similar photographs. However, if the user is dissatisfied with the results the CBIR system does not provide them with a way to refine search goals.

Example 1

One implementation allows users to search a catalog of personal photographs. Users are initially shown an arbitrary photograph (the primary result), e.g., the most recent photograph taken or viewed. This is displayed in the center of a 3×3 grid of photographs from the catalog. Each of the photographs is selected to be close (defined below) to the primary result but different from each other along different axes relative to the primary result. For example, if the primary result is a photograph taken with family last week at home, then other photographs may be a) with the family last year at home, b) with the family last week outdoors, c) without the family last week at home, etc. In some situations, the system may place two photographs on opposite sides of the primary result which are along the same axis but differ from each other in their positions along that axis. For example, the photo placed on the left side may show family member A more prominently than in the primary result, while the photo placed on the right side may show family member A less prominently than in the primary result.

The user selects one of the 9 photographs which then becomes the primary result. This is then laid out in an updated 3×3 grid of photographs again "close" to it but different from each other.

If at any point the user double clicks on the primary result then the definition of "close" changes to a "smaller scale" (defined below). If the user uses a "pinch out" gesture then the definition of "close" changes to a "larger scale" and the result set is updated.

In this way a user may navigate a catalog of photographs to find specific ones.

In this example photographs may be considered similar with respect to a number of criteria, including:
- GPS location of the photograph
- Time of the photograph
- Color content of the photograph
- Whether the photograph was taken indoors or outdoors
- Whether there are people in the photograph
- Who is in the photograph
- Whether people in the photograph are happy or sad
- The activity depicted in the photograph
- The objects contained in the photograph And many others. These criteria are captured into a numerical "distance", or as a vector locating photographs in some space. In the latter case a standard notion of similarity or distance may be used, e.g., the dot product or Euclidean distance. In an embodiment, a normalization function can be applied in order that distances along different axes are comparable to each other.

As the user navigates a catalog of photos the "scale" at which the user is searching changes. This scale specifies how "close" the photos in the result set are to the primary result. More precisely all photos in the result set must have a "distance" less than some threshold. As the scale increases or decreases this threshold increases or decreases.

Considering this example with respect to the steps described above:
- Embedding: For each photograph in a user's catalog of personal photographs a vector is produced that has indices corresponding to, e.g., the longitude, the latitude, the time of day, the day of week, the number of faces, whether a given activity is depicted, among many others.

Initial Query: In this case the initial query is empty, that is all photos are candidate results and the one presented to the user is arbitrary.

Initial Query as geometric constraints: The initial query produces an empty set of geometric constraints The geometric constraints are applied to the set of embedded photographs to identify those that satisfy the constraints, i.e., the candidate results A discriminative subset of 9 photographs is selected from the candidate results using farthest first traversal.

The 9 photographs are presented to the user in a 3×3 grid

The user selects one of the photographs to indicate a desire to see more photographs like that one.

The user selected photograph is processed to yield a new geometric constraint which can be represented as a sphere around the selected photograph in the embedding space. This new constraint is added to the current set of constraints. The combined constraint is the intersection of spheres around all photographs selected so far.

Example 2

Another implementation looks at searching for accessories (apparel, furniture, apartments, jewelry, etc). In this implementation the user searches using text, speech, or with a prototype image as an initial query. For example, a user searches for "brown purse" using text entry. The search engine responds by identifying a diverse set of possible results, e.g., purses of various kinds and various shades of brown. These results are laid out in a 2 dimensional arrangement (for example a grid), whereby more similar results are positioned closer to each other and more different results are positioned relatively far from each other. The user then selects one or more images, for example using radio buttons. The image selections are then used by the search engine to define a "search direction" or a vector in the embedding space along which further results may be obtained.

Considering this example with respect to the steps described above:

Embedding: For each entry in an accessories catalog a vector is produced using deep learning techniques trained to differentiate accessories.

Initial Query: In this case the initial query is a textual search that narrows further results to be within a portion of the full catalog. This restricted is the set of initial candidate results.

Initial Query as geometric constraints: The initial query produces an empty set of geometric constraints The geometric constraints are applied to the set of embedded accessories in the restricted set (i.e., the initial candidate results) to identify those that satisfy the constraints, i.e., the candidate results A diverse subset of 9 catalog entries is selected from the candidate results using farthest first traversal.

The 9 catalog entries are presented to the user in a 3×3 grid

The user selects one of the catalog entries to indicate a desire to see more accessories like that one.

The user selected accessory is processed to yield a new geometric constraint which can be represented as a sphere around the selected accessory in the embedding space. This new constraint is added to the current set of constraints. The combined constraint is the intersection of spheres around all accessories selected so far.

Some Variations

Documents are encoded in an embedding space such as a vector space or metric space (via a distance). Searches proceed as a sequence of query refinements. Query refinements are encoded as geometric constraints over the vector space or metric space. Discriminative candidate results are displayed to provide the user with the ability to add discriminative constraints. User inputs, e.g., selecting or deselecting results, are encoded as geometric constraints.

Variations of this approach will be apparent to the reader. For example the documents may embedded after the initial query is process and only those documents satisfying the query may be embedded. Similarly, the documents may be re-embedded using a different embedding at any point in the process. In this case, the geometric constraints would be re-interpreted in the new embedding.

The geometric constraints may be augmented at any point with non-geometric constraints. In this case the candidate results can be filtered in a straightforward way to select only those satisfying the non-geometric constraints. In this way the interaction can be augmented with faceted search, text, or speech inputs. At each iteration of the process the geometric constraints can be managed together with a set of non-geometric constraints.

An example implementation may proceed through these steps:

1. Obtaining a collection of prototype images (at least 1) from a user;
2. Identifying all images in the collection with a distance less than a threshold T from the prototype images;
3. Identifying a discriminative subset of the images collected in (2);
4. Presenting the discriminative subset of images to the user in a 2-dimensional layout;
5. If the user is satisfied with one of the presented images, receiving an indication of such satisfaction and taking desired action with respect to the selected image;
6. If the user is not yet satisfied, obtaining from the user a selection of the presented images more like the desired result;
7. Producing a revised collection of prototype images;
8. Reducing threshold T;
9. Goto 2.

The above method may be viewed either from the viewpoint of the user interacting with a computer system, or the viewpoint of a computer system interacting with a user, or both.

The concept may be generalized to refer to "digital documents" rather than images, where digital documents include audio, video, text, html, multimedia documents and product listings in a digital catalog, in addition to images.

The concept may also be generalized so that the initial collection obtained at step 1 is obtained as the result of the user performing a search (query) within another information retrieval system or search engine.

The concept may also be generalized so that rather than reducing the threshold at step 8, the user interface provides for the ability to decrease or increase the threshold or leave it unchanged.

The concept may also be generalized so that at steps 1, and 6 there are two collections of prototype images and at step 2 the system identifies images with distance less than threshold T1 of the first set, and greater than T2 of the second set.

The concept may also be generalized so that at one iteration of step 6 the user selects image(s) along a first subset of at least one axis, and at another iteration of step 6 the user selects image(s) along a second subset of at least one axis, where the second subset of axes contains at least one axis not included in the first subset of axes.

Example Uses

The search method of FIG. 9 (including all its variations as mentioned herein) may be used for a variety of purposes, several of which are outlined below.

Figure 12:
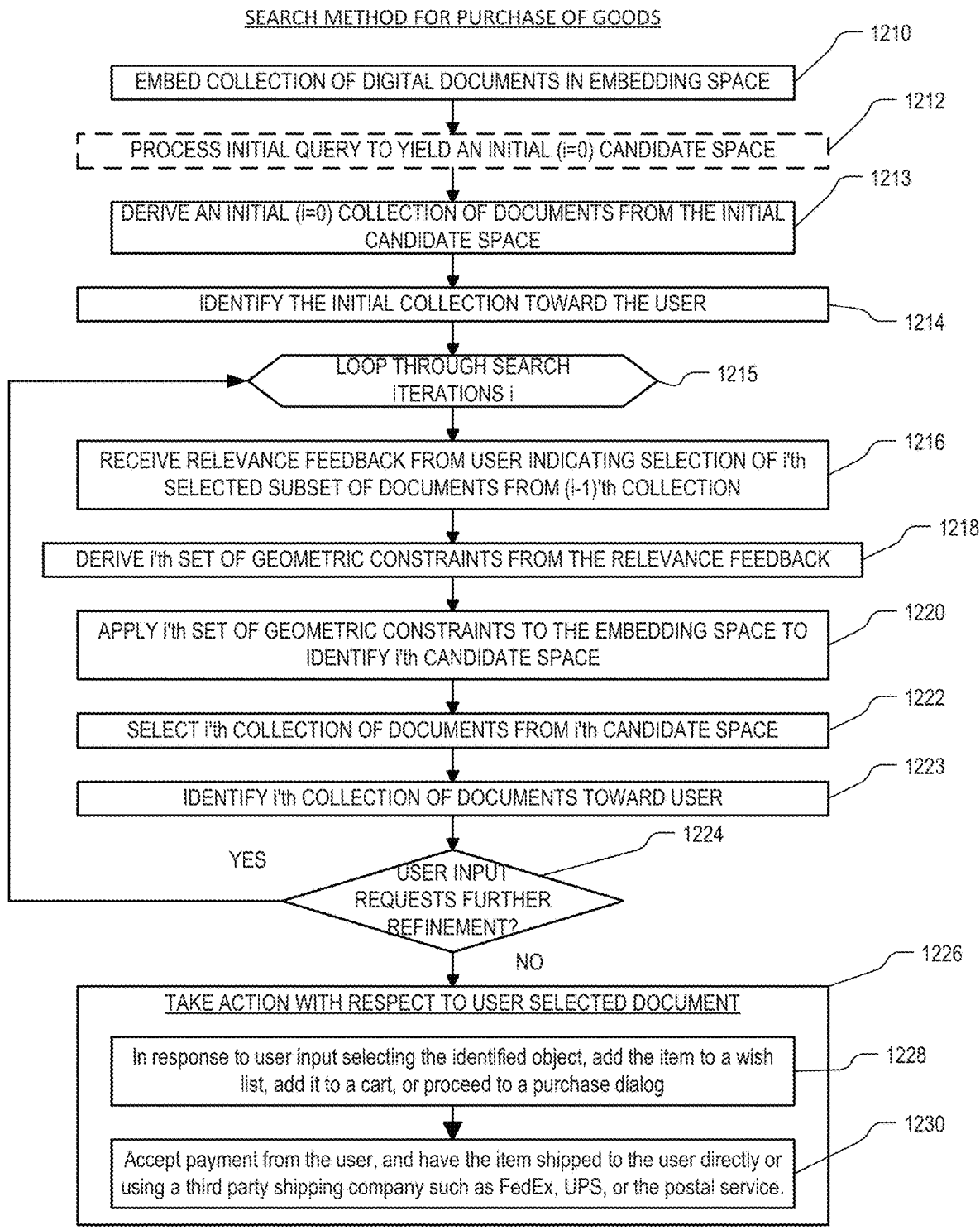
FIG. 12 is a flow chart of a search method according to an aspect the invention used for the purchase of a physical product.

FIG. 12 is a flow chart of the search method of FIG. 9 used for the purchase of a physical product such as clothing, jewelry, furniture, shoes, accessories, real estate, cars, artworks, photographs, posters, prints, and home décor. All of the variations mentioned herein can be used with the method of FIG. 12.

Initially, in step 1210, a catalog of digital documents is embedded in an embedding space and stored in a database. In the database, a distance is identified between each pair of the documents in the embedding space corresponding to a predetermined measure of dissimilarity between the products represented by the pair of documents. In step 1212, an initial query is optionally processed to yield an initial (i=0) candidate space of documents satisfying the query results. The initial query may be a conventional text query, for example. The initial candidate space is within and optionally smaller than the full catalog of documents. In step 1213 an initial collection of digital documents is derived from the initial candidate space. This initial (i=0) collection of documents is a subset of the initial candidate space. In one embodiment the initial collection of documents is selected as a discriminative subset of the catalog, while in another embodiment the initial collection of documents is not discriminative. In step 1214, the initial collection of documents is identified toward the user. In one embodiment this can include displaying a representation of the documents in the initial collection visibly to the user. In step 1215 an iterative search process is begun beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from step 1214. If i>1, then this collection of documents is the (i−1)'th collection of documents as presented to the user in step 1223 of the prior iteration.

At the beginning of the i'th iteration, in step 1216, the user provides relative feedback as to the documents in the (i−1)'th collection of documents. Preferably the relative feedback takes the form of user selection of a subset of the documents from the (i−1)'th collection, where selection of a document implies that the user considers products represented by the that document to be more relevant to a search target than the products represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset. In step 1218, a set of geometric constraints is derived from the relative feedback, in a manner described elsewhere herein. The set of geometric constraints derived in the i'th iteration is referred to as the i'th set of geometric constraints.

In step 1220, the i'th set of geometric constraints is applied to the embedding space to form an i'th candidate space, and in step 1222 an i'th collection of candidate documents is selected as a subset of the documents in the i'th candidate space. In one embodiment the i'th collection of documents is selected as a discriminative subset of the i'th candidate space, while in another embodiment the i'th collection of documents is not discriminative. In step 1223 the i'th collection of documents is presented toward the user for optional further refinement. In step 1224, if user input indicates further refinement is desired, then the logic returns to step 1215 for the next iteration of the search loop. Otherwise the user indicates to commit, and in step 1226 the system takes action with respect to the user-selected document.

The "take action" step 1226 in FIG. 12, then involves (1) in response to user input selecting the identified object, the system to adding the item to a wish list, adding it to a cart, or proceeding to a purchase dialog (step 1228); and (2) the system, perhaps at a later time, accepting payment from the user, and having the item shipped to the user directly or using a third party shipping company such as FedEx, UPS, or the postal service (step 1230). The steps of accepting payment and shipping can be performed in any order. For free products payment may not be required. Corresponding submodules are included in Action Module 830 (FIG. 8).

Figure 13:
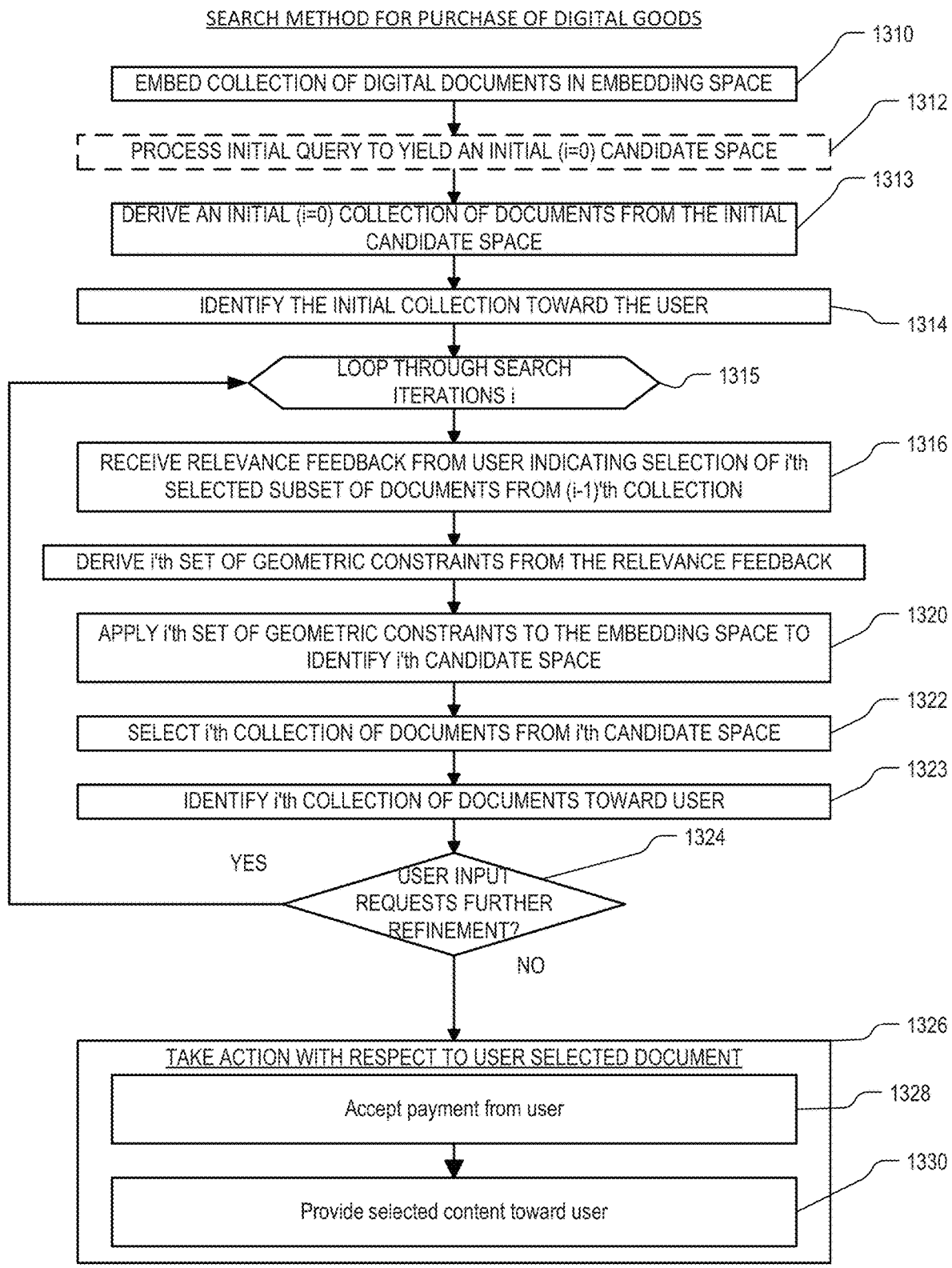
FIG. 13 is a flow chart of a search method according to an aspect the invention used for the purchase of a digital product.

FIG. 13 is a flow chart of the search method of FIG. 9 used for the purchase of a digital product, e.g., movies, music, photographs, or books. All of the variations mentioned herein can be used with the method of FIG. 13.

Initially, in step 1310, a catalog of digital documents is embedded in an embedding space and stored in a database. In the database, a distance is identified between each pair of the documents in the embedding space corresponding to a predetermined measure of dissimilarity between digital products represented by the pair of documents. In step 1312, an initial query is optionally processed to yield an initial (i=0) candidate space of documents satisfying the query results. The initial query may be a conventional text query, for example. The initial candidate space is within and optionally smaller than the full catalog of documents. In step 1313 an initial collection of digital documents is derived from the initial candidate space. This initial (i=0) collection of documents is a subset of the initial candidate space. In one embodiment the initial collection of documents is selected as a discriminative subset of the catalog, while in another embodiment the initial collection of documents is not discriminative. In step 1314, the initial collection of documents is identified toward the user. In one embodiment this can include displaying a representation of the documents in the initial collection visibly to the user. In step 1315 an iterative search process is begun beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from step 1314. If i>1, then this collection of documents is the (i−1)'th collection of documents as presented to the user in step 1323 of the prior iteration.

At the beginning of the i'th iteration, in step 1316, the user provides relative feedback as to the documents in the (i−1)'th collection of documents. Preferably the relative feedback takes the form of user selection of a subset of the documents from the (i−1)'th collection, where selection of a document implies that the user considers the digital product represented by that document to be more relevant to a search target than digital products represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset. In step 1318, a set of geometric constraints is derived from the relative feedback, in a manner described elsewhere herein. The set of geometric constraints derived in the i'th iteration is referred to as the i'th set of geometric constraints.

In step 1320, the i'th set of geometric constraints is applied to the embedding space to form an i'th candidate space, and in step 1322 an i'th collection of candidate documents is selected as a subset of the documents in the i'th candidate space. In one embodiment the i'th collection of documents is selected as a discriminative subset of the i'th candidate space, while in another embodiment the i'th collection of documents is not discriminative. In step 1323 the i'th collection of documents is presented toward the user for optional further refinement. In step 1324, if user input indicates further refinement is desired, then the logic returns to step 1315 for the next iteration of the search loop. Otherwise the user indicates to commit, and in step 1326 the system takes action with respect to the user-selected document.

The "take action" step 1326 in FIG. 13, then involves the system, optionally and perhaps at a later time, accepting payment from the user (step 1328) and providing the content to the user (or having it provided) using some means of distributing digital content, e.g., email or streaming (step 1330). The steps of accepting payment and providing content can be performed in any order. For free products payment may not be required. Corresponding submodules are included in Action Module 830 (FIG. 8).

Figure 14:
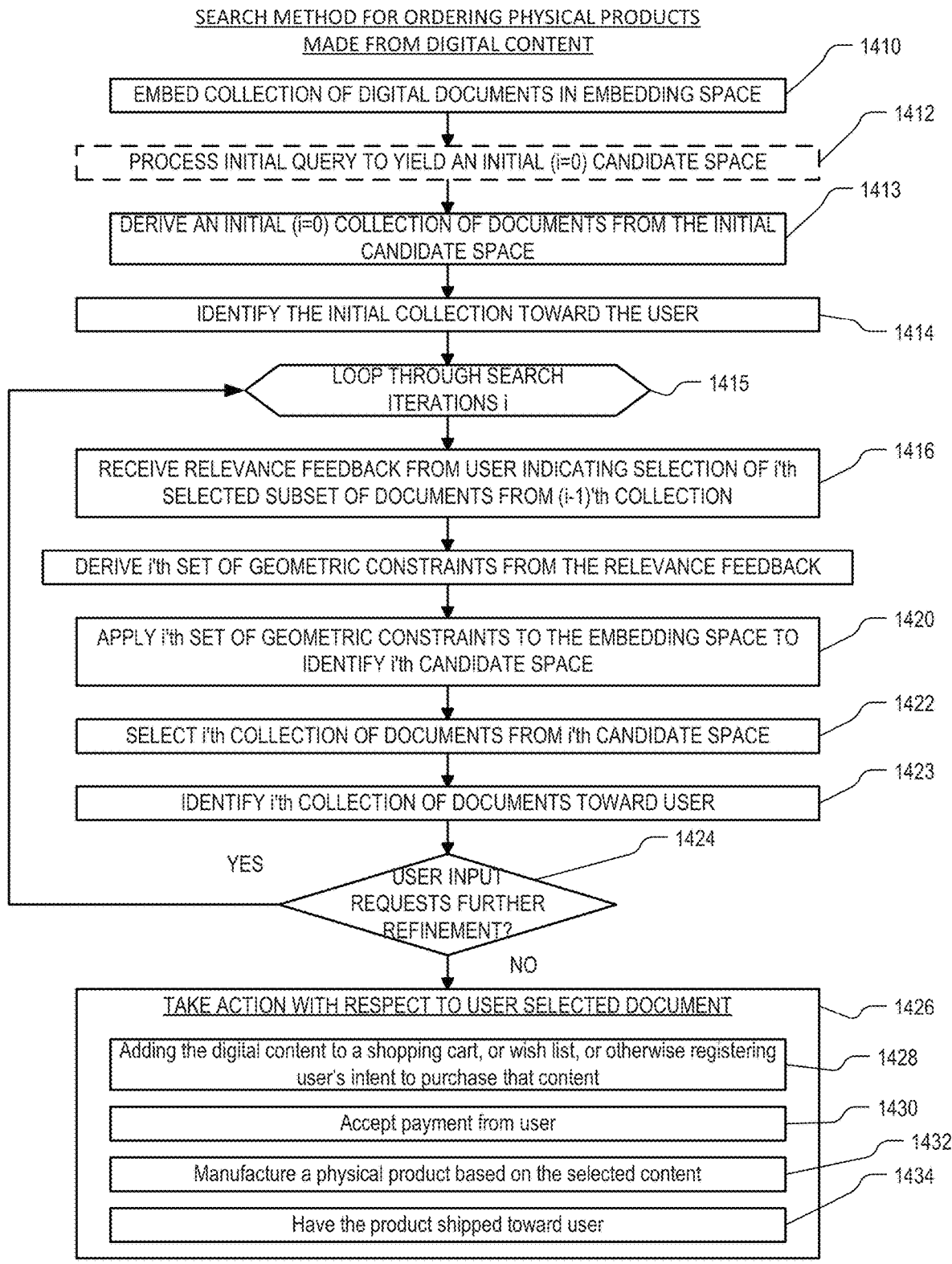
FIG. 14 is a flow chart of a search method according to an aspect the invention used to identify digital content that is then used to produce a physical product.

FIG. 14 is a flow chart of the search method of FIG. 9 used to identify digital content that is then used to produce a physical product. For example, the digital content may consist of a catalog of images which may then be printed on a poster, t-shirt, or mug. All of the variations mentioned herein can be used with the method of FIG. 14.

Initially, in step 1410, a catalog of digital documents is embedded in an embedding space and stored in a database. In the database, a distance is identified between each pair of the documents in the embedding space corresponding to a predetermined measure of dissimilarity between digital content represented by the pair of documents. In step 1412, an initial query is optionally processed to yield an initial (i=0) candidate space of documents satisfying the query results. The initial query may be a conventional text query, for example. The initial candidate space is within and optionally smaller than the full catalog of documents. In step 1413 an initial collection of digital documents is derived from the initial candidate space. This initial (i=0) collection of documents is a subset of the initial candidate space. In one embodiment the initial collection of documents is selected as a discriminative subset of the catalog, while in another embodiment the initial collection of documents is not discriminative. In step 1414, the initial collection of documents is identified toward the user. In one embodiment this can include displaying a representation of the documents in the initial collection visibly to the user. In step 1415 an iterative search process is begun beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from step 1414. If i>1, then this collection of documents is the (i−1)'th collection of documents as presented to the user in step 1423 of the prior iteration.

At the beginning of the i'th iteration, in step 1416, the user provides relative feedback as to the documents in the (i−1)'th collection of documents. Preferably the relative feedback takes the form of user selection of a subset of the documents from the (i−1)'th collection, where selection of a document implies that the user considers the digital content represented by that document to be more relevant to a search target than digital content represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset. In step 1418, a set of geometric constraints is derived from the relative feedback, in a manner described elsewhere herein. The set of geometric constraints derived in the i'th iteration is referred to as the i'th set of geometric constraints.

In step 1420, the i'th set of geometric constraints is applied to the embedding space to form an i'th candidate space, and in step 1422 an i'th collection of candidate documents is selected as a subset of the documents in the i'th candidate space. In one embodiment the i'th collection of documents is selected as a discriminative subset of the i'th candidate space, while in another embodiment the i'th collection of documents is not discriminative. In step 1423 the i'th collection of documents is presented toward the user for optional further refinement. In step 1424, if user input indicates further refinement is desired, then the logic returns to step 1415 for the next iteration of the search loop. Otherwise the user indicates to commit, and in step 1426 the system takes action with respect to the user-selected document.

The "take action" step 1426 in FIG. 14, then involves the following steps performed by the system:
  Adding the selected digital content to a shopping cart, or wish list, or otherwise recording the user's intent to purchase a product based on the selected content (step 1428). This step may also include recording the user's selection of a particular kind of product (e.g. a mug or a mouse pad).
  Accepting payment from the user (step 1430)
  Manufacturing a physical product based on the selected content, e.g., by reproducing that content on a physical artifact (step 1432)
  Shipping the physical product to the user or having it shipped by a delivery service (step 1434).

The step of accepting payment may be performed after the manufacturing step or after the shipping step in various embodiments. Also, Corresponding submodules are included in Action Module 830 (FIG. 8). Preferably, the sole purpose of the above embodiment is to identify content to enable the manufacture and purchase of a physical product.

Figure 15:
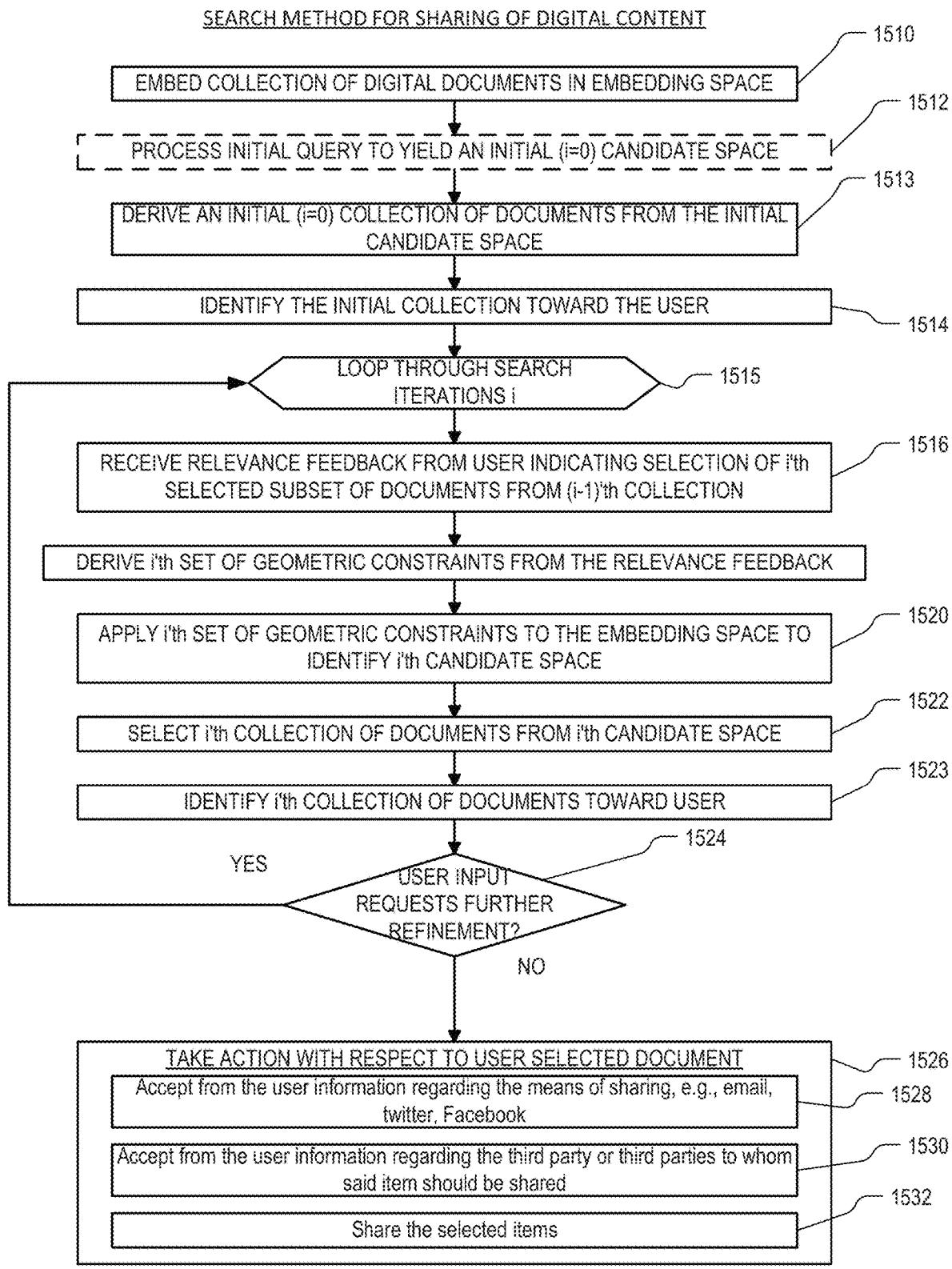
FIG. 15 is a flow chart of a search method according to an aspect the invention used to identify content for sharing.

FIG. 15 is a flow chart of the search method of FIG. 9 used to identify content for sharing. For example, the digital documents in the embedding space may consist of a catalog of the user's personal photographs or other media. All of the variations mentioned herein can be used with the method of FIG. 15.

Initially, in step 1510, a catalog of digital documents is embedded in an embedding space and stored in a database. In the embodiment of FIG. 15, the catalog may be the user's library of personal photographs, for example. In the database, a distance is identified between each pair of the documents in the embedding space corresponding to a predetermined measure of dissimilarity between content represented by the pair of documents. In step 1512, an initial query is optionally processed to yield an initial (i=0) candidate space of documents satisfying the query results. The initial query may be a conventional text query, for example. The initial candidate space is within and optionally smaller than the full catalog of documents. In step 1513 an initial collection of digital documents is derived from the initial candidate space. This initial (i=0) collection of documents is a subset of the initial candidate space. In one embodiment the initial collection of documents is selected as a discriminative subset of the catalog, while in another embodiment the initial collection of documents is not discriminative. In step 1514, the initial collection of documents is identified toward the user. In one embodiment this can include displaying a representation of the documents in the initial collection visibly to the user. In step 1515 an iterative search process is begun beginning with an iteration numbered herein for convenience as iteration 1.

Before the beginning of each i'th iteration, the user is presented with a collection of documents from the prior iteration (i−1). If i=1, then this collection of documents is the initial (i=0) collection of documents from step 1514. If i>1, then this collection of documents is the (i−1)'th collection of documents as presented to the user in step 1523 of the prior iteration.

At the beginning of the i'th iteration, in step 1516, the user provides relative feedback as to the documents in the (i−1)'th collection of documents. Preferably the relative feedback takes the form of user selection of a subset of the documents from the (i−1)'th collection, where selection of a document implies that the user considers content represented by that document to be more relevant to a search target than content represented by unselected documents from the (i−1)'th collection. The selected subset in the i'th iteration is referred to herein as the i'th selected subset, and those documents from the (i−1)'th collection which were not selected are sometimes referred to herein collectively as the i'th non-selected subset. In step 1518, a set of geometric constraints is derived from the relative feedback, in a manner described elsewhere herein. The set of geometric constraints derived in the i'th iteration is referred to as the i'th set of geometric constraints.

In step 1520, the i'th set of geometric constraints is applied to the embedding space to form an i'th candidate space, and in step 1522 an i'th collection of candidate documents is selected as a subset of the documents in the i'th candidate space. In one embodiment the i'th collection of documents is selected as a discriminative subset of the i'th candidate space, while in another embodiment the i'th collection of documents is not discriminative. In step 1523 the i'th collection of documents is presented toward the user for optional further refinement. In step 1524, if user input indicates further refinement is desired, then the logic returns to step 1515 for the next iteration of the search loop. Otherwise the user indicates to commit, and in step 1526 the system takes action with respect to the user-selected document.

The "take action" step 1526 in FIG. 15, then involves the following steps performed by the system:
Accepting from the user information regarding the means of sharing, e.g., email, twitter, Facebook (step 1528)
Accepting from the user information regarding the third party or third parties to whom said item should be shared (step 1530)
Sharing the select item(s) item (step 1532).

The step of accepting from the user information regarding the means of sharing may be performed before or after the step of accepting from the user information regarding the third party or third parties to whom said item should be shared. Also, Corresponding submodules are included in Action Module 830 (FIG. 8). Again, preferably the sole purpose of the above embodiment is identifying content to be shared.

Computer Environments

Figure 1:
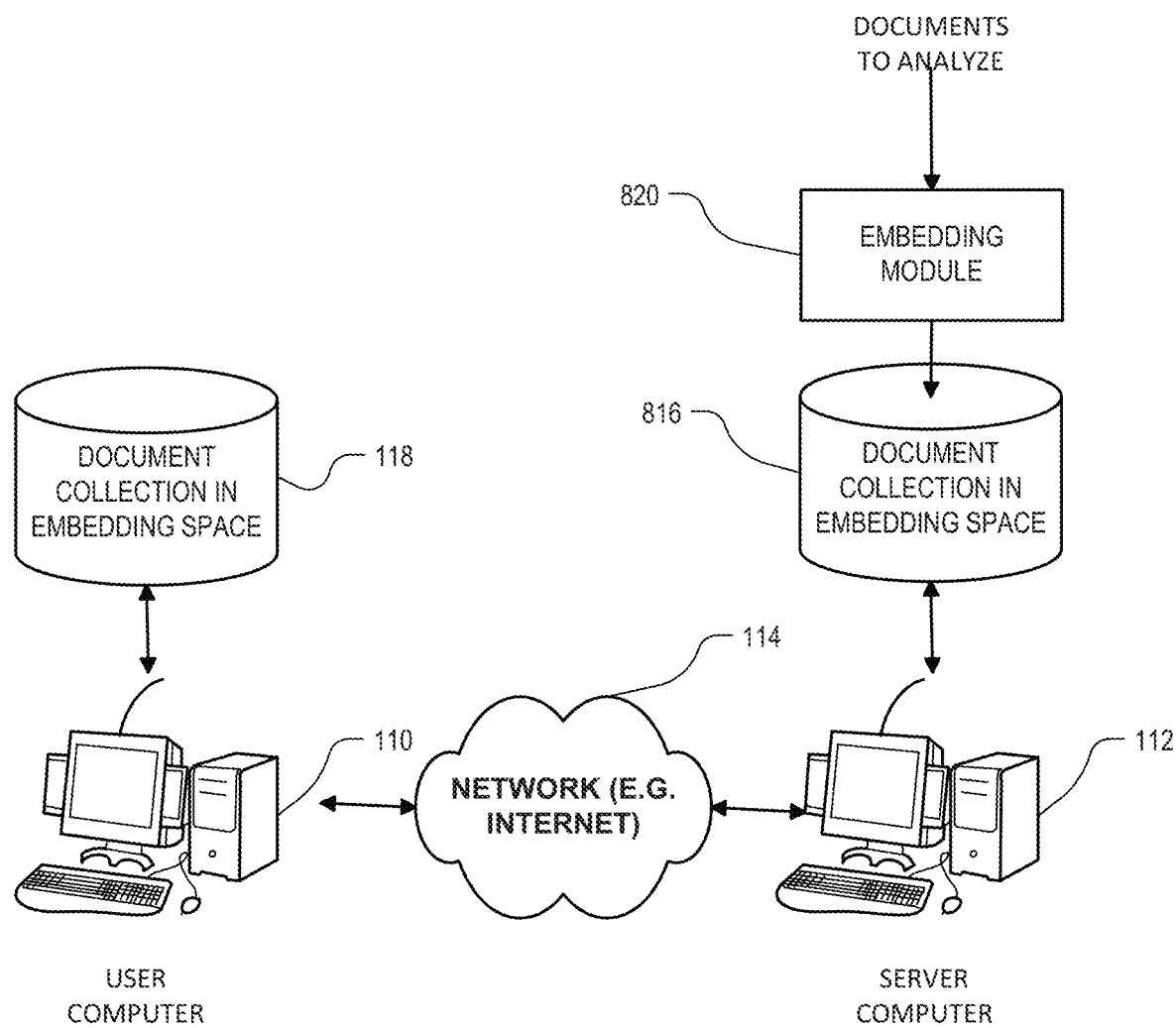
FIG. 1 illustrates an example environment in which aspects of the invention may be implemented.

FIG. 1 illustrates an example environment in which aspects of the invention may be implemented. The system includes a user computer 110 and a server computer 112, connected to each other via a network 114 such as the Internet. The server computer 112 has accessibly thereto the database 816 identifying documents in association with embedding information, such as relative distances and/or their positions in a vector space. The user computer 110 also in various embodiments may or may not have accessibly thereto a database 118 identifying the same information.

Initially, embedding module 820 (which may for example be the server computer 112 or a separate computer system or a process running on such a computer) analyzes a catalog of documents to extract embedding information about the documents. For example, if the documents are photographs, the embedding module 820 may include a neural network and may use deep learning to derive embedding image information from the photographs.

Alternatively, embedding module 820 may derive a library of image classifications (axes on which a given photograph may be placed), each in association with an algorithm for recognizing in a given photograph whether (or with what probability) the given photograph satisfies that classification. Then the embedding module 820 may apply its pre-developed library to a smaller set of newly provided photographs, such as the photos currently on the user computer 110, in order to determine embedding information applicable to each photograph. Either way, the embedding module 820 writes into the database 816 the identifications of the catalog of documents that the user may search, each in association with its embedding information.

In yet another embodiment, the embedding information that embedding module 820 writes into database 816 may be provided from an external source, or entered manually.

The iterative identification steps described above can be implemented in a number of different ways. In one embodiment, all computation takes place on the server computer 112, as the user iteratively searches for a desired document. The user, operating the user computer 110, sees all results only by way of a browser. In this embodiment, it is not necessary that the user computer 110 have the document catalog database 118 accessibly thereto. In another embodiment, the server computer 112 transmits its entire database 118 of documents in embedding space (or a subset of that database) to the user computer 110, which writes it into its own database 118. All computation takes place on the user computer 110 in such an embodiment, as the user iteratively searches for a desired document. Many other arrangements are possible as well.

Computer Hardware

Figure 2:
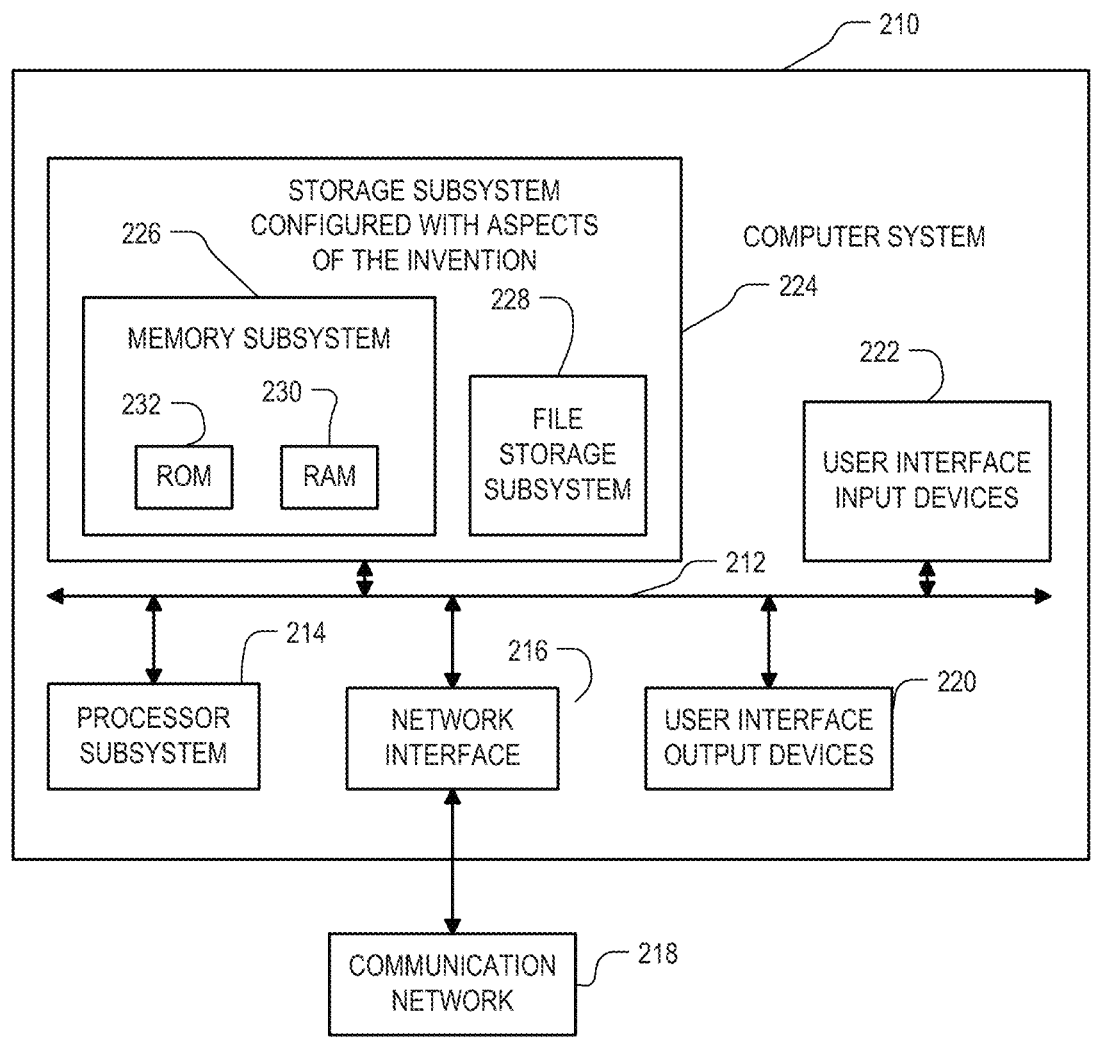
FIG. 2 is a simplified block diagram of a computer system that can be used to implement aspects of the present invention.

FIG. 2 is a simplified block diagram of a computer system 210 that can be used to implement software incorporating aspects of the present invention. The drawing represents both an embodiment of user computer 110 and server computer 112. In the embodiment of FIG. 18, the drawing also represents an embodiment of both server computer 1810 and mobile device 1812. While the above-described methods indicate individual logic steps or modules for carrying out specified operations, it will be appreciated that each step or module actually causes the computer system 210 to operate in the specified manner.

Computer system 210 typically includes a processor subsystem 214 which communicates with a number of peripheral devices via bus subsystem 212. These peripheral devices may include a storage subsystem 224, comprising a memory subsystem 226 and a file storage subsystem 228, user interface input devices 222, user interface output devices 220, and a network interface subsystem 216. The input and output devices allow user interaction with computer system 210. Network interface subsystem 216 provides an interface to outside networks, including an interface to communication network 218, and is coupled via communication network 218 to corresponding interface devices in other computer systems. Communication network 218 may comprise many interconnected computer systems and communication links. These communication links may be wireline links, optical links, wireless links, or any other mechanisms for communication of information, but typically it is an IP-based communication network. While in one embodiment, communication network 218 is the Internet, in other embodiments, communication network 218 may be any suitable computer network.

The physical hardware component of network interfaces are sometimes referred to as network interface cards (NICs), although they need not be in the form of cards: for instance they could be in the form of integrated circuits (ICs) and connectors fitted directly onto a motherboard, or in the form of macrocells fabricated on a single integrated circuit chip with other components of the computer system.

User interface input devices 222 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 210 or onto computer network 218. It is by way of input devices 222 that the user provides queries and query refinements to the system.

User interface output devices 220 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 210 to the user or to another machine or computer system. It is by way of output devices 220 that the system presents query result layouts toward the user.

Storage subsystem 224 stores the basic programming and data constructs that provide the functionality of certain embodiments of the present invention. For example, the various modules implementing the functionality of certain embodiments of the invention may be stored in storage subsystem 224. These software modules are generally executed by processor subsystem 214.

Memory subsystem 226 typically includes a number of memories including a main random access memory (RAM) 230 for storage of instructions and data during program execution and a read only memory (ROM) 232 in which fixed instructions are stored. File storage subsystem 228 provides persistent storage for program and data files, and may include a hard disk drive, a floppy disk drive along with associated removable media, a CD ROM drive, an optical drive, or removable media cartridges. The databases and modules implementing the functionality of certain embodiments of the invention may have been provided on a computer readable medium such as one or more CD-ROMs, and may be stored by file storage subsystem 228. The host memory 226 contains, among other things, computer instructions which, when executed by the processor subsystem 214, cause the computer system to operate or perform functions as described herein. As used herein, processes and software that are said to run in or on "the host" or "the computer", execute on the processor subsystem 214 in response to computer instructions and data in the host memory subsystem 226 including any other local or remote storage for such instructions and data.

Bus subsystem 212 provides a mechanism by which the various components and subsystems of computer system 210 communicate with each other as intended. Although bus subsystem 212 is shown schematically as a single bus, alternative embodiments of the bus subsystem may use multiple busses.

Computer system 210 itself can be of varying types including a personal computer, a portable computer, a workstation, a computer terminal, a network computer, a television, a mainframe, a server farm, or any other data processing system or user device. In particular, it is envisaged that user computer 110 may be a hand-held device such as a tablet computer or a smart-phone. In another embodiment, a "system" performs all the operations described herein, and the "system" can be implemented as a single computer or multiple computers with any desired allocation of operations among the different member computers. Due to the ever-changing nature of computers and networks, the description of computer system 210 depicted in FIG. 2 is intended only as a specific example for purposes of illustrating the preferred embodiments of the present invention. Many other configurations of computer system 210 are possible having more or less components than the computer system depicted in FIG. 2.

While the present invention has been described in the context of a fully functioning data processing system, those of ordinary skill in the art will appreciate that the processes described herein are capable of being distributed in the form of a computer readable medium of instructions and data and that the invention applies equally regardless of the particular type of signal bearing media actually used to carry out the distribution. As used herein, a computer readable medium is one on which information can be stored and read by a computer system. Examples include a floppy disk, a hard disk drive, a RAM, a CD, a DVD, flash memory, a USB drive, and so on. The computer readable medium may store information in coded formats that are decoded for actual use in a particular data processing system. A single computer readable medium, as the term is used herein, may also include more than one physical item, such as a plurality of CD-ROMs or a plurality of segments of RAM, or a combination of several different kinds of media. As used herein, the term does not include mere time varying signals in which the information is encoded in the way the signal varies over time.

Clauses

The following clauses describe various examples of methods and systems relating to aspects of the invention, some of which are additional to the aspects set forth in the claims.

Clause 1. A system for user identification of a desired document, comprising:

a processor; and a computer readable medium coupled to the processor, the computer readable medium having stored thereon in a non-transitory manner a plurality of software code portions defining logic for:

a first module to provide in a computer readable medium in a non-transitory manner a database identifying a catalog of documents in an embedding space, the database identifying a distance between each pair of the documents in the embedding space corresponding to a predetermined measure of dissimilarity between the products represented by the pair of documents, a second module to identify toward the user an initial (i=0) collection of N0>1 candidate documents from an initial (i=0) candidate space within the embedding space, the initial collection having fewer documents than the initial candidate space, a third module to, for each i'th iteration in a plurality of iterations, beginning with a first iteration (i=1):

in response to user selection of an i'th selected subset of the documents from the (i−1)'th collection of documents, geometrically constrain the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identify toward the user an i'th collection of Ni>1 candidate documents from the i'th candidate space, Ni being smaller than the number of documents in the i'th candidate space, and a fourth module to cause action to be taken in response to user selection of a particular subset of documents identified toward the user, wherein the predefined definition of collective closeness is defined such that a candidate document X is considered closer to a document A than to a document B if in the embedding space, $d(A,X)<d(B,X)$.

Clause 2. The system of clause 1, wherein each i'th collection of documents identified toward the user by the second module is more discriminative than the average discriminativeness of set size N1 documents in the i'th candidate space.

Clause 3. The system of clause 1, wherein the first module comprises:

a module to learn an embedding in dependence upon training data which includes only documents that are considered to be within a predefined subject domain; and a module to embed the documents from the catalog of documents into the embedding space in dependence upon the learned embedding, wherein all of the documents in the catalog of documents are considered to be within the subject domain.

Clause 4. The system of clause 1, wherein in geometrically constraining the embedding space in each i'th iteration to identify an i'th candidate space, the third module:

identifies a respective i'th set of geometric constraints on the embedding space;

determines, for each of at least some particular documents in the i'th candidate space, an aggregation of penalties associated with each of the geometric constraints in the first through i'th sets of geometric constraints which is not satisfied by the particular document, non-satisfaction of each of the geometric constraints being pre-associated with a respective penalty; and includes in the i'th candidate space only Ri of the documents from the embedding space, where the aggregate penalty of each of the Ri documents is no higher than the aggregate penalty of any other document in the embedding space for which an aggregation was determined by the third module.

Clause 5. The system of clause 1, wherein in identifying toward the user an initial (i=0) collection of N0>1 candidate documents from the initial (i=0) candidate space, the second module:

identifies clusters of similar documents in the initial candidate space; and chooses the initial collection to include at least one document from each of the identified clusters.

Clause 6. The system of clause 5, wherein in identifying toward the user an initial collection of candidate documents, the second module identifies toward a medoid of each of the clusters.

Clause 7. The system of clause 1, wherein in geometrically constraining the embedding space to identify each i'th candidate space, the third module identifies a respective i'th set of geometric constraints on the embedding space.

Clause 8. The system of clause 7, wherein each j'th one of the geometric constraints identifies a respective pair of documents $(A_j, B_j)$ in the embedding space, and is defined so as to be satisfied by a particular candidate document X if $d(A_j,X)<d(B_j,X)$.

Clause 9. The system of clause 7, wherein those documents in each (i−1)'th collection which were identified toward the user by the third module but which are not in the i'th selected subset define an i'th non-selected subset of documents, wherein in geometrically constraining the embedding space to identify each i'th candidate space, in response to user selection of an i'th selected subset of the documents from the (i−1)'th collection of documents, the third module adds a plurality of added constraints on the embedding space, wherein the plurality of added constraints are satisfied by a particular candidate document X if and only if $d(A,X)<d(B,X)$ for all documents A in the i'th selected subset and for all documents B in the i'th non-selected subset of documents.

Clause 10. The system of clause 1, wherein in geometrically constraining the embedding space to identify each i'th candidate space, the third module updates a hyperplane in the embedding space, the i'th candidate space being a region of the embedding space which is bounded by the updated hyperplane.

Clause 11. The system of clause 1, wherein the embedding space is a metric space, and wherein in geometrically constraining the embedding space to identify each i'th candidate space, the third module updates an m-hyperplane in the embedding space, the i'th candidate space being a region of the embedding space which is bounded by the updated hyperplane.

Clause 12. The system of clause 1, wherein in geometrically constraining the embedding space to identify each i'th candidate space, the third module treats the i'th subset of documents selected by the user in a machine learning algorithm as training data to update a hypothesis of the user's desired target.

Clause 13. The system of clause 1, wherein in geometrically constraining the embedding space to identify each i'th candidate space, the third module identifies a respective i'th set of geometric constraints on the embedding space, further comprising:

a fifth module which maintains a constraints database identifying at least two of the sets of geometric constraints; and a sixth module which, in response to a user request after a Q'th one of the iterations to return to a P'th candidate space, P<Q, identifies toward the user a set of NP>1 candidate documents from the P'th candidate space.

Clause 14. A method for user acquisition of products, comprising:

providing, accessibly to a computer system, a database identifying a catalog of documents in an embedding space, each of the documents in the catalog of documents representing a product, the database identifying a distance between each pair of the documents in the embedding space corresponding to a predetermined measure of dissimilarity between the products represented by the pair of documents;

a computer system identifying toward the user an initial (i=0) collection of N0>1 candidate documents from an initial (i=0) candidate space within the embedding space, the initial collection having fewer documents than the initial candidate space;

for each i'th iteration in a plurality of iterations, beginning with a first iteration (i=1):

in response to user selection of an i'th selected subset of the documents from the (i−1)'th collection of documents, a computer system geometrically constraining the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identifying toward the user an i'th collection of Ni>1 candidate documents from the i'th candidate space, Ni being smaller than the number of documents in the i'th candidate space; and in response to user selection of a particular document identified toward the user, causing shipment toward the user a product represented by the particular document.

Clause 15. The method of clause 14, further comprising, in further response to user selection of the particular document, accepting payment for the product represented by the particular document.

Clause 16. A system for user acquisition of products, comprising:

a processor; and a computer readable medium coupled to the processor, the computer readable medium having stored thereon in a non-transitory manner a plurality of software code portions defining logic for:

a first module to provide in a computer readable medium in a non-transitory manner a database identifying a catalog of documents in an embedding space, each of the documents in the catalog of documents representing a product, the database identifying a distance between each pair of the documents in the embedding space corresponding to a predetermined measure of dissimilarity between the products represented by the pair of documents, a second module to identify toward the user an initial (i=0) collection of N0>1 candidate documents from an initial (i=0) candidate space within the embedding space, the initial collection having fewer documents than the initial candidate space, a third module to, for each i'th iteration in a plurality of iterations, beginning with a first iteration (i=1):

in response to user selection of an i'th selected subset of the documents from the (i−1)'th collection of documents, geometrically constrain the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identify toward the user an i'th collection of Ni>1 candidate documents from the i'th candidate space, Ni being smaller than the number of documents in the i'th candidate space, and a fourth module to, in response to user selection of a particular document identified toward the user, cause shipment toward the user a product represented by the particular document.

Clause 17. A method for user acquisition of digital content, comprising:

providing, accessibly to a computer system, a database identifying a catalog of documents in an embedding space, each of the documents in the catalog of documents representing respective digital content, the database identifying a distance between each pair of the documents in the embedding space corresponding to a predetermined measure of dissimilarity between the digital content represented by the pair of documents;

a computer system identifying toward the user an initial (i=0) collection of N0>1 candidate documents from an initial (i=0) candidate space within the embedding space, the initial collection having fewer documents than the initial candidate space;

for each i'th iteration in a plurality of iterations, beginning with a first iteration (i=1):

in response to user selection of an i'th selected subset of the documents from the (i−1)'th collection of documents, a computer system geometrically constraining the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identifying toward the user an i'th collection of Ni>1 candidate documents from the i'th candidate space, Ni being smaller than the number of documents in the i'th candidate space; and in response to user selection of a particular document identified toward the user, causing delivery toward the user digital content represented by the particular document.

Clause 18. The method of clause 17, wherein the digital content is a member of the group consisting of a file, an image, a video, an audio file, and a streaming media program.

Clause 19. A system for user acquisition of digital content, comprising:

a processor; and a computer readable medium coupled to the processor, the computer readable medium having stored thereon in a non-transitory manner a plurality of software code portions defining logic for:

a first module to provide in a computer readable medium in a non-transitory manner a database identifying a catalog of documents in an embedding space, each of the documents in the catalog of documents representing respective digital content, the database identifying a distance between each pair of the documents in the embedding space corresponding to a predetermined measure of dissimilarity between the digital content represented by the pair of documents, and a second module to identify toward the user an initial (i=0) collection of N0>1 candidate documents from an initial (i=0) candidate space within the embedding space, the initial collection having fewer documents than the initial candidate space, a third module to, for each i'th iteration in a plurality of iterations, beginning with a first iteration (i=1):

in response to user selection of an i'th selected subset of the documents from the (i−1)'th collection of documents, geometrically constrain the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identify toward the user an i'th collection of Ni>1 candidate documents from the i'th candidate space, Ni being smaller than the number of documents in the i'th candidate space, and a fourth module to, in response to user selection of a particular document identified toward the user, cause delivery toward the user digital content represented by the particular document.

Clause 20. A method for manufacturing physical products made from digital content, comprising:

providing, accessibly to a computer system, a database identifying a catalog of documents in an embedding space, each of the documents in the catalog of documents representing respective digital content, the database identifying a distance between each pair of the documents in the embedding space corresponding to a predetermined measure of dissimilarity between the digital content represented by the pair of documents;

a computer system identifying toward the user an initial (i=0) collection of N0>1 candidate documents from an initial (i=0) candidate space within the embedding space, the initial collection having fewer documents than the initial candidate space;

for each i'th iteration in a plurality of iterations, beginning with a first iteration (i=1):

in response to user selection of an i'th selected subset of the documents from the (i−1)'th collection of documents, a computer system geometrically constraining the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identifying toward the user an i'th collection of Ni>1 candidate documents from the i'th candidate space, Ni being smaller than the number of documents in the i'th candidate space; and in response to user selection of a particular document identified toward the user, causing manufacture and delivery of a physical product based on the digital content represented by the particular document.

Clause 21. A system for manufacturing physical products made from digital content, comprising:

a processor; and a computer readable medium coupled to the processor, the computer readable medium having stored thereon in a non-transitory manner a plurality of software code portions defining logic for:

a first module to provide in a computer readable medium in a non-transitory manner a database identifying a catalog of documents in an embedding space, each of the documents in the catalog of documents representing respective digital content, the database identifying a distance between each pair of the documents in the embedding space corresponding to a predetermined measure of dissimilarity between the digital content represented by the pair of documents, and a second module to identify toward the user an initial (i=0) collection of N0>1 candidate documents from an initial (i=0) candidate space within the embedding space, the initial collection having fewer documents than the initial candidate space, a third module to, for each i'th iteration in a plurality of iterations, beginning with a first iteration (i=1):

in response to user selection of an i'th selected subset of the documents from the (i−1)'th collection of documents, geometrically constrain the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identify toward the user an i'th collection of Ni>1 candidate documents from the i'th candidate space, Ni being smaller than the number of documents in the i'th candidate space, and a fourth module to, in response to user selection of a particular document identified toward the user, cause manufacture and delivery of a physical product based on the digital content represented by the particular document.

Clause 22. A method for sharing of digital content, comprising:

providing, accessibly to a computer system, a database identifying a catalog of documents in an embedding space, each of the documents in the catalog of documents representing respective digital content, the database identifying a distance between each pair of the documents in the embedding space corresponding to a predetermined measure of dissimilarity between the digital content represented by the pair of documents;

a computer system identifying toward the user an initial (i=0) collection of N0>1 candidate documents from an initial (i=0) candidate space within the embedding space, the initial collection having fewer documents than the initial candidate space;

for each i'th iteration in a plurality of iterations, beginning with a first iteration (i=1):

in response to user selection of an i'th selected subset of the documents from the (i−1)'th collection of documents, a computer system geometrically constraining the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identifying toward the user an i'th collection of Ni>1 candidate documents from the i'th candidate space, Ni being smaller than the number of documents in the i'th candidate space; and in response to user selection of a particular document identified toward the user, causing sharing of the digital content represented by the particular document.

Clause 23. A system for sharing of digital content, comprising:

a processor; and a computer readable medium coupled to the processor, the computer readable medium having stored thereon in a non-transitory manner a plurality of software code portions defining logic for:

a first module to provide in a computer readable medium in a non-transitory manner a database identifying a catalog of documents in an embedding space, each of the documents in the catalog of documents representing respective digital content, the database identifying a distance between each pair of the documents in the embedding space corresponding to a predetermined measure of dissimilarity between the digital content represented by the pair of documents, and a second module to identify toward the user an initial (i=0) collection of N0>1 candidate documents from an initial (i=0) candidate space within the embedding space, the initial collection having fewer documents than the initial candidate space, a third module to, for each i'th iteration in a plurality of iterations, beginning with a first iteration (i=1):

in response to user selection of an i'th selected subset of the documents from the (i−1)'th collection of documents, geometrically constrain the embedding space to identify an i'th candidate space such that, according to a predefined definition of collective closeness, the documents in the i'th candidate space are collectively closer in the embedding space to the documents in the i'th selected subset, than are the documents in the (i−1)'th candidate space; and identify toward the user an i'th collection of Ni>1 candidate documents from the i'th candidate space, Ni being smaller than the number of documents in the i'th candidate space, and a fourth module to, in response to user selection of a particular document identified toward the user, cause sharing of the digital content represented by the particular document.

Clause 24. A system for user identification of a desired document, comprising a client device and a server device each having a processor and a computer readable medium coupled to the respective processor and having stored thereon in a non-transitory manner a plurality of software code portions, the server having accessibly thereto a document database stored in a computer readable medium, the document database identifying a catalog of documents in an embedding space, the document database further identifying a distance between each pair of the documents in the embedding space corresponding to a predetermined measure of dissimilarity between the pair of documents, the client device having accessibly thereto in a non-transitory manner in a computer readable medium a constraints database identifying a collection of geometric constraints on the embedding space, the plurality of software code portions on the server including:

a module to identify toward the client device an initial (i=0) collection of N0>1 candidate documents from an initial (i=0) candidate space within the embedding space, the initial collection having fewer documents than the initial candidate space; and a module to determine an i'th candidate space in dependence upon and in response to receipt from the client device of a collection of geometric constraints on the embedding space, and to identify toward the client device an i'th collection of Ni>1 candidate documents from the i'th candidate space, Ni being smaller than the number of documents in the i'th candidate space, and the plurality of software code portions on the client device including a module to present toward the user collections of candidate documents received from the server, the plurality of software code portions on the client device further including a module to, for each i'th iteration in a plurality of iterations, beginning with a first iteration (i=1):

in response to receipt from the server of an (i−1)'th collection of documents, present the (i−1)'th collection of documents toward the user;

in response to user selection of an i'th selected subset of the documents from the (i−1)'th collection of documents presented toward the user, develop an i'th set of at least one geometric constraint on the embedding space, the i'th set of geometric constraints identifying an i'th candidate space such that, according to a predefined definition of collective closeness, the documents in the i'th candidate space are collectively closer in the embedding space to the documents in the i'th selected subset, than are the documents in the (i−1)'th candidate space;

update the constraints database in accordance with the i'th set of geometric constraints; and forward the collection of constraints in the constraints database toward the server for determining the i'th candidate space, the plurality of software code portions on the client device further including a module to cause action to be taken in response to user selection of a particular subset of documents presented toward the user.

Clause 25. The server as described in clause 24.

Clause 26. The client device as described in clause 24.

As used herein, a given event or value is "responsive" to a predecessor event or value if the predecessor event or value influenced the given event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

The applicant hereby discloses in isolation each individual feature described herein in the specification and in the claims, and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. In particular, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for user identification of a desired document, comprising:
    providing, accessibly to a computer system, a database identifying a first plurality of documents in an embedding space that is a geometric space of at least 3 dimensions containing documents distanced from one another in dependence on dissimilarity of document features with respect to one another, such that documents of each respective pair of two documents, of all pairs of the documents in the embedding space, are spaced apart from one another in dependence upon a distance that corresponds to a dissimilarity of the document features of the two documents of the respective pair of two documents;
    in dependence upon receiving a user query seeking a document, from the embedding space, having one or more particular features:
        the computer system geometrically constraining the embedding space to develop a first candidate space,
        the computer system choosing a first set of $N1>1$ candidate documents from the first candidate space by excluding documents from the first candidate space, the first set of $N1>1$ candidate documents having fewer documents than the first candidate space and being chosen such that user selection of any document in the first set of $N1>1$ candidate documents will exclude more documents from the first candidate space based on dissimilarities of document features than would user selection of any document from other possible sets of N1 documents from the first candidate space, averaged over all other possible sets of N1 documents from the first candidate space, and
        identifying the first set of $N1>1$ candidate documents toward the user; and
    taking action in response to user selection of a document from the first set of $N1>1$ candidate documents identified toward the user.

2. The method of claim 1, wherein the first set of $N1>1$ candidate documents is at least as discriminative as all other sets of size N1 documents in the first candidate space.

3. The method of claim 1, wherein taking action comprises:
    the computer system geometrically constraining the first candidate space to develop a second candidate space, the second candidate space being a geometrically constrained portion of the first candidate space determined in dependence upon user selection of a subset of the documents in the first set of $N1>1$ candidate documents;
    identifying toward the user a second set of $N2>1$ candidate documents from the second candidate space, the second set of $N2>1$ candidate documents having fewer documents than the second candidate space and being more discriminative than the average discriminativeness of set size N2 documents in the second candidate space; and
    taking action in response to user selection of a document from the second set of $N2>1$ candidate documents.

4. The method of claim 1, wherein the embedding space comprises a multi-dimensional vector space, each of the dimensions in the vector space defining a different basis on which documents can differ from each other,
    and wherein the database identifies a position for each of the documents in the multi-dimensional vector space.

5. The method of claim 4, wherein taking action comprises:
    a computer system identifying toward the user a second set of $N2>1$ candidate documents from the first candidate space, at least one pair of documents in the second set of $N2>1$ candidate documents having different coordinates along a second dimension in the multi-dimensional vector space and being more discriminative than the average discriminativeness of set size N2 documents in the first candidate space, wherein the second dimension differs from all the dimensions of the multi-dimensional vector space along which documents in the first set of $N1>1$ candidate documents differ from each other; and
    taking action in response to user selection of a document from the second set of $N2>1$ candidate documents.

6. The method of claim 4, wherein identifying toward the user a first set of $N1>1$ candidate documents from the first candidate space comprises presenting toward the user an M-dimensional layout, $M>1$, identifying the first set of $N1>1$ candidate documents, the placement of candidate documents in the layout being indicative of dimensions in the first candidate space along which the candidate documents differ.

7. The method of claim 4, wherein providing a database comprises:
    determining, from the first plurality of documents, a first plurality of dimensions along which at least some of the documents in the first plurality of documents differ;
    a computer system determining a position in each dimension in the first plurality of dimensions, for each of the documents in the first plurality of documents; and
    a computer system associating in the database each document in the first plurality of documents with its position in each dimension in the first plurality of dimensions.

8. The method of claim 1, wherein identifying toward the user a first set of N1>1 candidate documents from the first candidate space comprises presenting toward the user an M-dimensional layout, M>1, identifying the first set of N1>1 candidate documents, the placement of at least some candidate documents in the layout being indicative of the distances among the at least some candidate documents in the first candidate space.

9. The method of claim 1, further comprising identifying toward the user a primary candidate document,
wherein identifying toward the user a first set of N1>1 candidate documents from the first candidate space comprises presenting toward the user an M-dimensional layout, M>1, identifying the first set of N1>1 candidate documents,
and wherein the layout is such that collinearity with the primary candidate document of documents in the layout indicates substantial collinearity with the primary candidate document of documents in the embedding space.

10. The method of claim 1, wherein identifying toward the user a first set of N1>1 candidate documents from the first candidate space comprises presenting toward the user an M-dimensional layout, M>1, identifying the first plurality of documents, the placement of at least some candidate documents in the layout relative to each other being indicative of the distances among the at least some candidate documents in the first candidate space.

11. A system for user identification of a desired document, comprising:
a processor; and
a computer readable medium coupled to the processor, the computer readable medium having stored thereon in a non-transitory manner a plurality of software code portions defining logic for:
a first module to provide in a computer readable medium in a non-transitory manner a database identifying a first plurality of documents in an embedding space that is a geometric space of at least 3 dimensions containing documents distanced from one another in dependence on dissimilarity of document features with respect to one another, such that documents of each respective pair of two documents, of all pairs of the documents in the embedding space, are spaced apart from one another in dependence upon a distance that corresponds to a dissimilarity of the document features of the two documents of the respective pair of two documents,
a second module to, in dependence upon receiving a user query seeking a documents, from the embedding space, having one or more particular features:
geometrically constrain the embedding space to develop a first candidate space;
choose a first set of N1>1 candidate documents from the first candidate space by excluding documents from the first candidate space, the first set of N1>1 candidate documents having fewer documents than the first candidate space and being chosen such that user selection of any document in the first set of N1>1 candidate documents will exclude more documents from the first candidate space based on dissimilarities of document features than would user selection of any document from other possible sets of N1 documents from the first candidate space, averaged over all other possible sets of N1 documents from the first candidate space; and
identify the first set of N1>1 candidate documents toward the user, and
a third module to take action in response to user selection of a document from the first set of N1>1 candidate documents identified toward the user.

12. The system of claim 11, wherein the first set of N1>1 candidate documents is at least as discriminative as all other sets of size N1 documents in the first candidate space.

13. The system of claim 11, wherein the plurality of software code portions further define logic for:
a module to geometrically constrain the first candidate space to develop a second candidate space, the second candidate space being a geometrically constrained portion of the first candidate space determined in dependence upon user selection of a subset of the documents in the first set of N1>1 candidate documents; and
a module to identify toward the user a second set of N2>1 candidate documents from the second candidate space, the second set of N2>1 candidate documents having fewer documents than the second candidate space and being more discriminative than the average discriminativeness of set size N2 documents in the second candidate space.

14. The system of claim 11, wherein the embedding space comprises a multi-dimensional vector space, each of the dimensions in the vector space defining a different basis on which documents can differ from each other,
and wherein the database identifies a position for each of the documents in the multi-dimensional vector space.

15. The system of claim 14, wherein the plurality of software code portions further define logic for a module to identify toward the user a second set of N2>1 candidate documents from the first candidate space, at least one pair of documents in the second set of N2>1 candidate documents having different coordinates along a second dimension in the multi-dimensional vector space and being more discriminative than the average discriminativeness of set size 2 documents in the first candidate space, wherein the second dimension differs from all the dimensions of the multi-dimensional vector space along which documents in the first set of N1>1 candidate documents differ from each other.

16. The system of claim 14, wherein identifying toward the user a first set of N1>1 candidate documents from the first candidate space comprises presenting toward the user an M-dimensional layout, M>1, identifying the first set of N1>1 candidate documents, the placement of candidate documents in the layout being indicative of dimensions in the first candidate space along which the candidate documents differ.

17. The system of claim 14, wherein the first module comprises a plurality of software code portions defining logic for:
a module to determine, from the first plurality of documents, a first plurality of dimensions along which at least some of the documents in the first plurality of documents differ;
a module to determine a position in each dimension in the first plurality of dimensions, for each of the documents in the first plurality of documents; and
a module to associate in the database each document in the first plurality of documents with its position in each dimension in the first plurality of dimensions.

18. The system of claim 11, wherein identifying toward the user a first set of N1>1 candidate documents from the first candidate space comprises presenting toward the user an M-dimensional layout, M>1, identifying the first set of N1>1 candidate documents, the placement of at least some candidate documents in the layout being indicative of the distances among the at least some candidate documents in the first candidate space.

19. The system of claim 11, wherein the second module further identifies toward the user a primary candidate document,
- wherein identifying toward the user a first set of N1>1 candidate documents from the first candidate space comprises presenting toward the user an M-dimensional layout, M>1, identifying the first set of N1>1 candidate documents,
- and wherein the layout is such that collinearity with the primary candidate document of documents in the layout indicates substantial collinearity with the primary candidate document of documents in the embedding space.

20. A non-transitory computer readable medium, for use with a database identifying a first plurality of documents in an embedding space that is a geometric space of at least 3 dimensions containing documents distanced from one another in dependence on dissimilarity of document features with respect to one another, such that documents of each respective pair of two documents, of all pairs of the documents in the embedding space, are spaced apart from one another in dependence upon a distance that corresponds to a dissimilarity of the document features of the two documents of the respective pair of two documents, the non-transitory computer readable medium having stored thereon in a non-transitory manner a plurality of software code portions defining logic for, in dependence upon receiving a user query seeking a document, from the embedding space, having one or more particular features:
- geometrically constraining the embedding space to develop a first candidate space;
- choosing a first set of N1>1 candidate documents from the first candidate space by excluding documents from the first candidate space, the first set of N1>1 candidate documents having fewer documents than the first candidate space and being chosen such that user selection of any document in the first set of N1>1 candidate documents will exclude more documents from the first candidate space based on dissimilarities of document features than would user selection of any document from other possible sets of N1 documents from the first candidate space, averaged over all other possible sets of N1 documents from the first candidate space;
- identifying the first set of N1>1 documents toward the user; and
- taking action in response to user selection of a document from the first set of N1>1 candidate documents identified toward the user.

* * * * *